(12) United States Patent
Cheng et al.

(10) Patent No.: US 8,990,435 B2
(45) Date of Patent: Mar. 24, 2015

(54) METHOD AND APPARATUS FOR ACCESSING DATA OF MULTI-TILE ENCODED PICTURE STORED IN BUFFERING APPARATUS

(71) Applicant: Mediatek Inc., Hsin-Chu (TW)

(72) Inventors: Chia-Yun Cheng, Hsinchu County (TW); Yung-Chang Chang, New Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 13/681,426

(22) Filed: Nov. 20, 2012

(65) Prior Publication Data

US 2013/0076770 A1   Mar. 28, 2013

Related U.S. Application Data

(63) Continuation-in-part of application No. 13/304,372, filed on Nov. 24, 2011.

(60) Provisional application No. 61/566,984, filed on Dec. 5, 2011, provisional application No. 61/433,272, filed on Jan. 17, 2011.

(51) Int. Cl.
*G06F 3/00* (2006.01)
*G06F 5/00* (2006.01)
*G09G 5/00* (2006.01)
*H04N 19/129* (2014.01)
(Continued)

(52) U.S. Cl.
CPC .......... *G09G 5/001* (2013.01); *H04N 19/00115* (2013.01); *H04N 19/00272* (2013.01); *H04N 19/00278* (2013.01); *H04N 19/00484* (2013.01); *H04N 19/00521* (2013.01); *H04N 19/00533* (2013.01)
USPC ..................... 710/3; 710/30; 710/52; 345/547

(58) Field of Classification Search
None
See application file for complete search history.

(56) References Cited

U.S. PATENT DOCUMENTS 5,504,823 A    4/1996 Yoon
6,320,909 B1 * 11/2001 Takabatake et al. ..... 375/240.25
(Continued)

FOREIGN PATENT DOCUMENTS

CN    1798236 A    7/2006
CN    1881445 A    12/2006
(Continued)

OTHER PUBLICATIONS

"International Search Report" mailed on Dec. 20, 2012 for International application No. PCT/CN2012/081288, International filing date:Sep. 12, 2012.
(Continued)

*Primary Examiner* — Kris Rhu
(74) *Attorney, Agent, or Firm* — Winston Hsu; Scott Margo

(57) ABSTRACT

A method for read pointer maintenance of a buffering apparatus, which is arranged to buffer data of a multi-tile encoded picture having a plurality of tiles included therein, includes the following steps: judging if decoding of a first tile of the multi-tile encoded picture encounters a tile boundary of the first tile; and when it is judged that the tile boundary of the first tile is encountered, storing a currently used read pointer into a pointer buffer, and loading a selected read pointer from the pointer buffer to act as the currently used read pointer.

21 Claims, 20 Drawing Sheets

(51) Int. Cl.
  *H04N 19/174* (2014.01)
  *H04N 19/176* (2014.01)
  *H04N 19/423* (2014.01)
  *H04N 19/436* (2014.01)
  *H04N 19/44* (2014.01)

(56) References Cited

U.S. PATENT DOCUMENTS

| | | |
|---|---|---|
| 6,741,256 B2 | 5/2004 | Emberling |
| 7,583,851 B2 | 9/2009 | Kudo |
| 7,746,401 B2 | 6/2010 | Wu |
| 7,813,431 B2 | 10/2010 | MacInnis |
| 8,300,699 B2 | 10/2012 | Stivers |
| 2002/0085424 A1 | 7/2002 | Trivedi |
| 2003/0126226 A1 | 7/2003 | Ramey |
| 2003/0155944 A1 | 8/2003 | Verdoorn |
| 2004/0066852 A1 | 4/2004 | MacInnis |
| 2004/0143380 A1* | 7/2004 | Stam et al. ............ 701/36 |
| 2004/0189623 A1 | 9/2004 | Dunn |
| 2005/0053290 A1* | 3/2005 | Wada et al. ............ 382/233 |
| 2005/0175250 A1* | 8/2005 | Watanabe et al. ....... 382/247 |
| 2005/0276325 A1 | 12/2005 | Sato |
| 2006/0140498 A1 | 6/2006 | Kudo |
| 2007/0070830 A1 | 3/2007 | Weng |
| 2007/0088829 A1 | 4/2007 | Shima |
| 2008/0049240 A1* | 2/2008 | Yamamoto ............ 358/1.9 |
| 2009/0217004 A1 | 8/2009 | Van De Waerdt |
| 2010/0021142 A1 | 1/2010 | Minami |
| 2010/0061455 A1 | 3/2010 | Xu |
| 2010/0061461 A1 | 3/2010 | Bankoski |
| 2010/0061645 A1 | 3/2010 | Wilkins |
| 2010/0134330 A1 | 6/2010 | Sakaguchi |
| 2010/0226441 A1 | 9/2010 | Tung |
| 2010/0265260 A1* | 10/2010 | Swic et al. ............ 345/539 |
| 2011/0216834 A1 | 9/2011 | Zhou |
| 2012/0294366 A1 | 11/2012 | Eliyahu |
| 2013/0328896 A1* | 12/2013 | Belanger ............ 345/531 |

FOREIGN PATENT DOCUMENTS

| | | |
|---|---|---|
| CN | 101057224 A | 10/2007 |
| CN | 101087410 A | 12/2007 |
| CN | 101137052 A | 3/2008 |
| CN | 101448061 A | 6/2009 |
| TW | 200913723 | 3/2009 |
| TW | 200931983 | 7/2009 |

OTHER PUBLICATIONS

"International Search Report" mailed on Feb. 28, 2013 for International application No. PCT/CN2012/085145, International filing date: Nov. 23, 2012.

Peter Pirsch et al, VLSI Implementations of Image and Video Multimedia Processing Systems, IEEE Transactions on Circuits and Systems for Video Technology, Nov. 1, 1998, pp. 878-891, XP011014520, vol. 8. No. 7, IEEE, NJ, US.

Jim Bankoski et al, Technical Overview of VP8, An Open Source Video Codec for the Web, Jul. 11, 2011, XP031964900, IEEE, CA, USA.

Chia-Yun Cheng et al., Title: Apparatus and Method for Buffering Context Arrays Referenced for Performing Entropy Decoding Upon Multi-Tile Encoded Picture and Related Entropy Decoder, pending U.S. Appl. No. 14/343,388, filed Mar. 7, 2014.

Jason Garrett-Glaser, Diary of an x264 Developer, The first in-depth technical analysis of VP8, May 19, 2010, XP055133960, URL:http://x264dev.multimedia.cx/archives/377.

* cited by examiner

| | |
|---|---|
| 0 | Slice_0 |
| 16 | Slice_1 |
| 4 | Slice_2 |
| 28 | Slice_3 |

FIG. 13

METHOD AND APPARATUS FOR ACCESSING DATA OF MULTI-TILE ENCODED PICTURE STORED IN BUFFERING APPARATUS

CROSS REFERENCE TO RELATED APPLICATIONS

This application is a continuation-in-part of co-pending U.S. patent application Ser. No. 13/304,372 (filed on Nov. 24, 2011), which claims the benefit of U.S. provisional application No. 61/433,272 (filed on Jan. 17, 2011), and this application further claims the benefit of U.S. provisional application No. 61/566,984 (filed on Dec. 5, 2011). The entire contents of the related applications are incorporated herein by reference.

BACKGROUND

The disclosed embodiments of the present invention relate to video/image processing, and more particularly, to a method and apparatus for accessing data of a multi-tile encoded picture stored in a buffering apparatus.

VP8 is an open video compression format released by Google®. Like many modern video compression schemes, VP8 is based on decomposition of frames into square sub-blocks of pixels, prediction of such subblocks using previously constructed blocks, and adjustment of such predictions (as well as synthesis of unpredicted blocks) using a discrete cosine transform (DCT). In one special case, however, VP8 uses a Walsh-Hadamard transform (WHT) instead of the commonly used DCT.

WebP is an image format developed by Google® according to VP8. Specifically, WebP is based on VP8's intra-frame coding and uses a container based on resource interchange file format (RIFF). Besides, WebP is announced to be a new open specification that provides lossy compression for photographic images. In a large scale study of 900,000 web images, WebP images are found 39.8% smaller than Joint Photographic Experts Group (JPEG) images of similar quality. Webmasters, web developers and browser developers therefore can use the WebP format to create smaller, better looking images that can help to improve user's web surfing.

In accordance with the VP8/WebP specification, the input to a VP8/WebP decoder is a sequence of compressed frames whose order matches their order in time. Besides, every compressed frame has multiple partitions included therein. As the VP8/WebP bitstream is configured to transmit compressed frames each having a plurality of partitions included therein, how to efficiently buffer and decode each compressed frame of a multi-partition VP8/WebP bitstream becomes an important issue in this technical field.

As proposed in High-Efficiency Video Coding (HEVC) specification, one picture can be partitioned into multiple tiles. FIG. 19 is a diagram illustrating tiles adopted in the HEVC specification. FIG. 20 is a diagram illustrating a conventional decoding order of the tiles shown in FIG. 19. As shown in FIG. 19, one picture 10 is partitioned into a plurality of tiles $T_{11}'$-$T_{13}'$, $T_{21}'$-$T_{23}'$, $T_{31}'$-$T_{33}'$ separated by row boundaries (i.e., horizontal boundaries) $HB_1'$, $HB_2'$ and column boundaries (i.e., vertical boundaries) $VB_1'$, $VB_2'$. Inside each tile, largest coding units (LCUs)/treeblocks (TBs) are raster scanned, as shown in FIG. 20. For example, LCUs/TBs orderly indexed by the Arabic numbers in the same tile $T_{11}$ are decoded sequentially. Inside each multi-tile picture, tiles are raster scanned, as shown in FIG. 20. For example, the tiles $T_{11}'$-$T_{13}'$, $T_{21}'$-$T_{23}'$ and $T_{31}'$-$T_{33}'$ are decoded sequentially. Specifically, one picture can be uniformly partitioned by tiles or partitioned into specified LCU-column-row tiles. A tile is a partition which has vertical and horizontal boundaries, and it is always rectangular with an integer number of LCUs/TBs included therein.

In accordance with HEVC specification, there are two types of tiles, independent tiles and dependent tiles. As to the independent tiles, they are treated as sub-pictures/sub-streams. Hence, encoding/decoding LCUs/TBs of an independent tile (e.g., motion vector prediction, intra prediction, deblocking filter (DF), sample adaptive offset (SAO), adaptive loop filter (ALF), entropy coding, etc.) does not need data from other tiles. Besides, assume that data of the LCUs/TBs is encoded/decoded using arithmetic coding such as a context-based adaptive binary arithmetic coding (CABAC) algorithm. Regarding each independent tile, the CABAC statistics are initialized/re-initialized at the start of the tile, and the LCUs outside the tile boundaries of the tile are regarded as unavailable. For example, the CABAC statistics at the first LCU/TB indexed by "1" in the tile $T_{11}'$ would be initialized when decoding of the tile $T_{11}'$ is started, the CABAC statistics at the first LCU/TB indexed by "13" in the tile $T_{12}'$ would be re-initialized when decoding of the tile $T_{12}'$ is started, the CABAC statistics at the first LCU/TB indexed by "31" in the tile $T_{13}'$ would be re-initialized when decoding of the tile $T_{13}'$ is started, and the CABAC statistics at the first LCU/TB indexed by "40" in the tile $T_{21}'$ would be re-initialized when decoding of the tile $T_{21}'$ is started.

However, encoding/decoding LCUs/TBs of a dependent tile (e.g., motion vector prediction, intra prediction, DF, SAO, ALF, entropy coding, etc.) has to consider data provided by other tiles. Hence, vertical and horizontal buffers are required for successfully decoding a multi-tile encoded picture/compressed frame having dependent tiles included therein. Specifically, the vertical buffer is used for buffering decoded information of LCUs/TBs of an adjacent tile beside a vertical boundary (e.g., a left vertical boundary) of a currently decoded tile, and the horizontal buffer is used for buffering decoded information of LCUs/TBs of another adjacent tile beside a horizontal boundary (e.g., a top horizontal boundary) of the currently decoded tile. As a result, the buffer size for decoding the multi-tile encoded picture/compressed frame would be large, leading to higher production cost. Besides, assume that data of the LCUs/TBs is encoded/decoded using arithmetic coding such as a CABAC algorithm. Regarding a dependent tile, the CABAC statistics may be initialized at the start of the tile or inherited from another tile. For example, the CABAC statistics at the first LCU/TB indexed by "1" in the tile $T_{11}'$ would be initialized when decoding of the tile $T_{11}'$ is started, the CABAC statistics at the first LCU/TB indexed by "13" in the tile $T_{12}'$ would be inherited from the CABAC statistics at the last LCU/TB indexed by "12" in the tile $T_{11}'$ when decoding of the tile $T_{12}'$ is started, the CABAC statistics at the first LCU/TB indexed by "31" in the tile $T_{13}'$ would be inherited from the CABAC statistics at the last LCU/TB indexed by "30" in the tile $T_{12}'$ when decoding of the tile $T_{13}'$ is started, and the CABAC statistics at the first LCU/TB indexed by "40" in the tile $T_{21}'$ would be inherited from the CABAC statistics at the last LCU/TB indexed by "39" in the tile $T_{13}'$ when decoding of the tile $T_{21}'$ is started.

Regarding the joint Photographic Experts Group extended range (JPEG-XR) specification, one picture can be partitioned into specified Macroblock-column-row tiles. A tile is a partition which has vertical and horizontal boundaries, and it is always rectangular with an integer number of macroblocks (MBs) included therein. Inside each tile, MBs are raster scanned. Inside each multi-tile picture, tiles are raster scanned. In accordance with JPEG-XR specification, there are two types of tiles, hard tiles and soft tiles. As to the hard tiles, they are treated as sub-pictures. Hence, encoding/decoding MBs of a hard tile does not need data from other tiles. However, encoding/decoding MBs of a soft tile has to consider data provided by other tiles. For example, in soft tiles, overlap filtering may be applied across tile boundaries.

As the multi-tile HEVC/JPEG-XR bitstream is configured to transmit encoded/compressed frames each having a plurality of tiles included therein, how to efficiently buffer and decode each encoded/compressed frame of the multi-tile HEVC/JPEG-XR bitstream becomes an important issue in this technical field.

SUMMARY

In accordance with exemplary embodiments of the present invention, a method and apparatus for accessing data of a multi-tile encoded picture in a buffering apparatus are proposed to solve the above-mentioned problem.

According to a first aspect of the present invention, an exemplary method for read pointer maintenance of a buffering apparatus is disclosed. The buffering apparatus is arranged to buffer data of a multi-tile encoded picture having a plurality of tiles included therein. The exemplary method includes: judging if decoding of a first tile of the multi-tile encoded picture encounters a tile boundary of the first tile; and when it is judged that the tile boundary of the first tile is encountered, storing a currently used read pointer into a pointer buffer, and loading a selected read pointer from the pointer buffer to act as the currently used read pointer.

According to a second aspect of the present invention, an exemplary buffer controller for read pointer maintenance of a buffering apparatus is disclosed. The exemplary buffering apparatus is arranged to buffer data of at least a multi-tile encoded picture having a plurality of tiles included therein. The exemplary buffer controller includes a judging unit and a control unit. The judging unit is arranged for judging if decoding of a first tile of the multi-tile encoded picture encounters a tile boundary of the first tile. The control unit is arranged for storing a currently used read pointer into a pointer buffer and loading a selected read pointer from the pointer buffer to act as the currently used read pointer when the judging unit judges that the tile boundary is encountered.

According to a third aspect of the present invention, an exemplary buffering apparatus for buffering data of at least a multi-tile encoded picture having a plurality of tiles included therein, is disclosed. The exemplary buffering apparatus includes a first storage space and a second storage space. The first storage space is arranged to buffer a first tile of the multi-tile encoded picture. The second storage space is arranged to buffer a second tile of the multi-tile encoded picture. The first tile is currently decoded, and the second tile is not currently decoded.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 13 is a diagram illustrating another sketch map of the multi-tile video/image bitstream according to an embodiment of the present invention.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

In accordance with the VP8/WebP specification, the input to a VP8/WebP decoder is a sequence of compressed frames each having 2-9 partitions. These partitions begin and end on byte boundaries. The leading partition of a compressed frame (i.e., the partition that is transmitted first) has two subsections: header information that applies to the compressed frame as a whole and per-macroblock prediction information that includes prediction information of each macroblock in the compressed frame. The remaining partitions (1, 2, 4 or 8) contain transform coefficients (e.g., DCT/WHT coefficients) of the residue signal.

Figure 1:
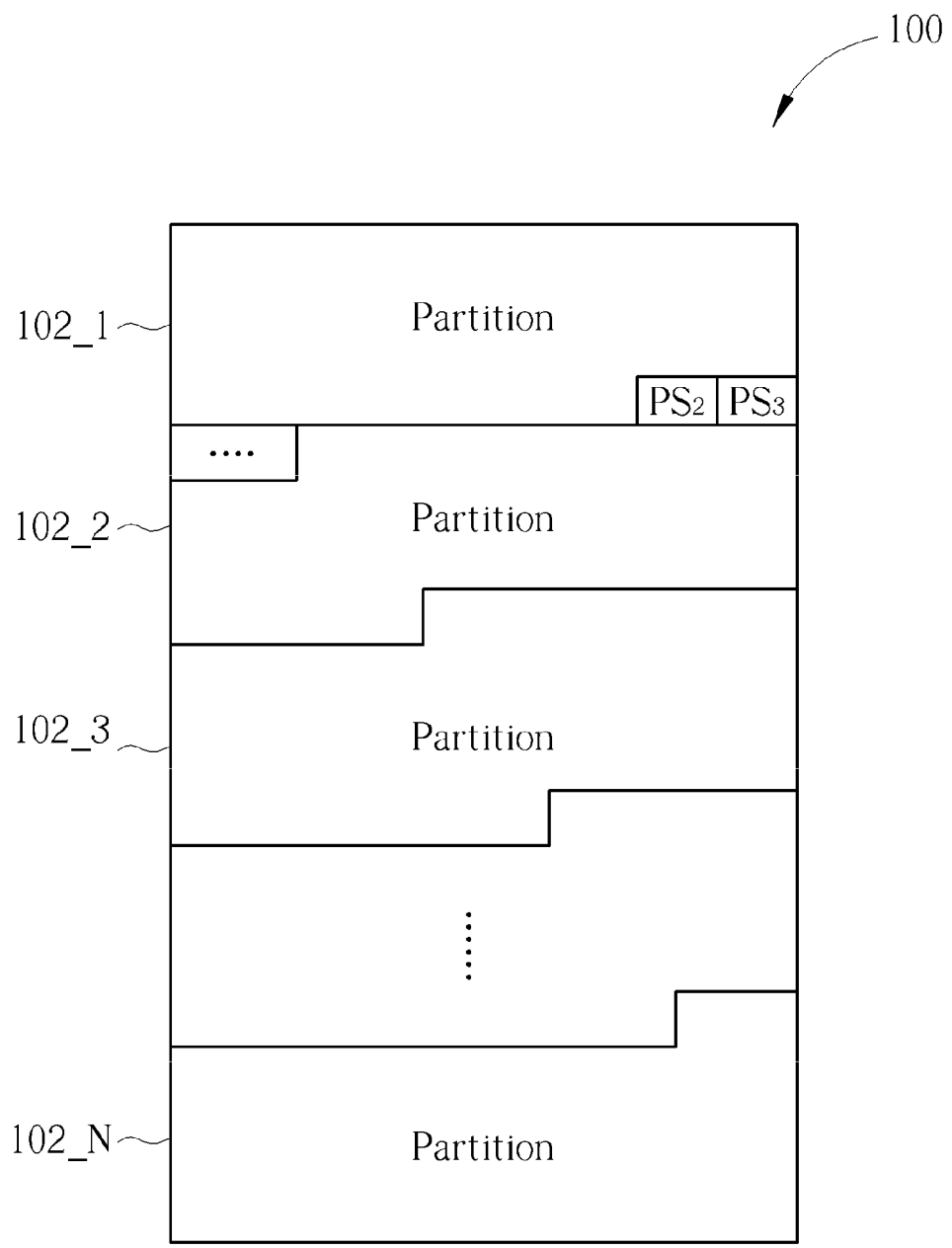
FIG. 1 is a diagram illustrating multiple partitions in a compressed frame to be processed by a proposed buffering apparatus of the present invention.

Please refer to FIG. 1, which is a diagram illustrating multiple partitions in a compressed frame to be processed by a proposed buffering apparatus of the present invention. The compressed frame 100 is transmitted via a VP8/WebP bitstream, and therefore contains N partitions 102_1-102_N which are sequentially transmitted. That is, the partition 102_1 is the leading partition of the compressed frame 100, and the partition 102_N is the last partition of the compressed frame 100. The partition 102_1 includes header information applied to the whole frame 100, and also includes the prediction information for each MB in the same frame 100. Regarding each of the remaining partitions 102_2-102_N following the partition 102_1, it includes transforming coefficients of the residue, such as DCT coefficients or WHT coefficients. When there is more than one partition for the transform coefficients, the sizes of the partitions—except the last partition—in bytes are also present in the bitstream right after the above-mentioned leading partition 102_1. Each of the partition sizes is recorded by a 3-byte data item. For example, a 3-byte partition size $PS_2$ shown in FIG. 1 indicates the size of the partition 102_2, and a 3-byte partition size $PS_3$ shown in FIG. 1 indicates the size of the partition 102_3. These partition sizes provide the decoding apparatus direct access to all DCT/WHT coefficient partitions, which may enable parallel processing of the coefficients in a decoding apparatus.

Figure 2:
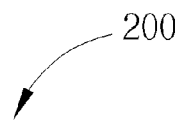
FIG. 2 is a diagram illustrating how transform coefficients in a compressed frame are packed into four partitions.

However, VP8/WebP packs the DCT/WHT coefficients from macroblock (MB) rows into separate partitions. Please refer to FIG. 2, which is a diagram illustrating how transform coefficients in a compressed frame are packed into four partitions. As shown in the figure, there are many MB rows MB_0-MB_15 in the exemplary compressed frame 200. The transform coefficients of the MB rows MB_0, MB_4, MB_8, and MB_12 are packed in a partition Partition_1, the transform coefficients of the MB rows MB_1, MB_5, MB_9, and MB_13 are packed in a partition Partition_2, the transform coefficients of the MB rows MB_2, MB_6, MB_10, and MB_14 are packed in a partition Partition_3, and the transform coefficients of the MB rows MB_3, MB_7, MB_11, and MB_15 are packed in a partition Partition_4. Therefore, as successive MB rows are not packed in the same partition, decoding of one MB may require data read from different partitions. In a case where the employed bitstream buffer does not have enough storage space for buffering data of the whole compressed frame, certain data requested by the decoder may not be immediately available in the bitstream buffer. As a result, the bitstream buffer may have to release the buffered data of one partition and then load the requested data in another partition.

However, switching between different partitions would lower the decoding speed due to the time period needed for loading the requested data. Thus, to improve the efficiency of decoding each compressed frame of a multi-partition VP8/WebP bitstream, the present invention therefore proposes an innovative buffer maintenance and control mechanism. Further details are described as below.

Figure 3:
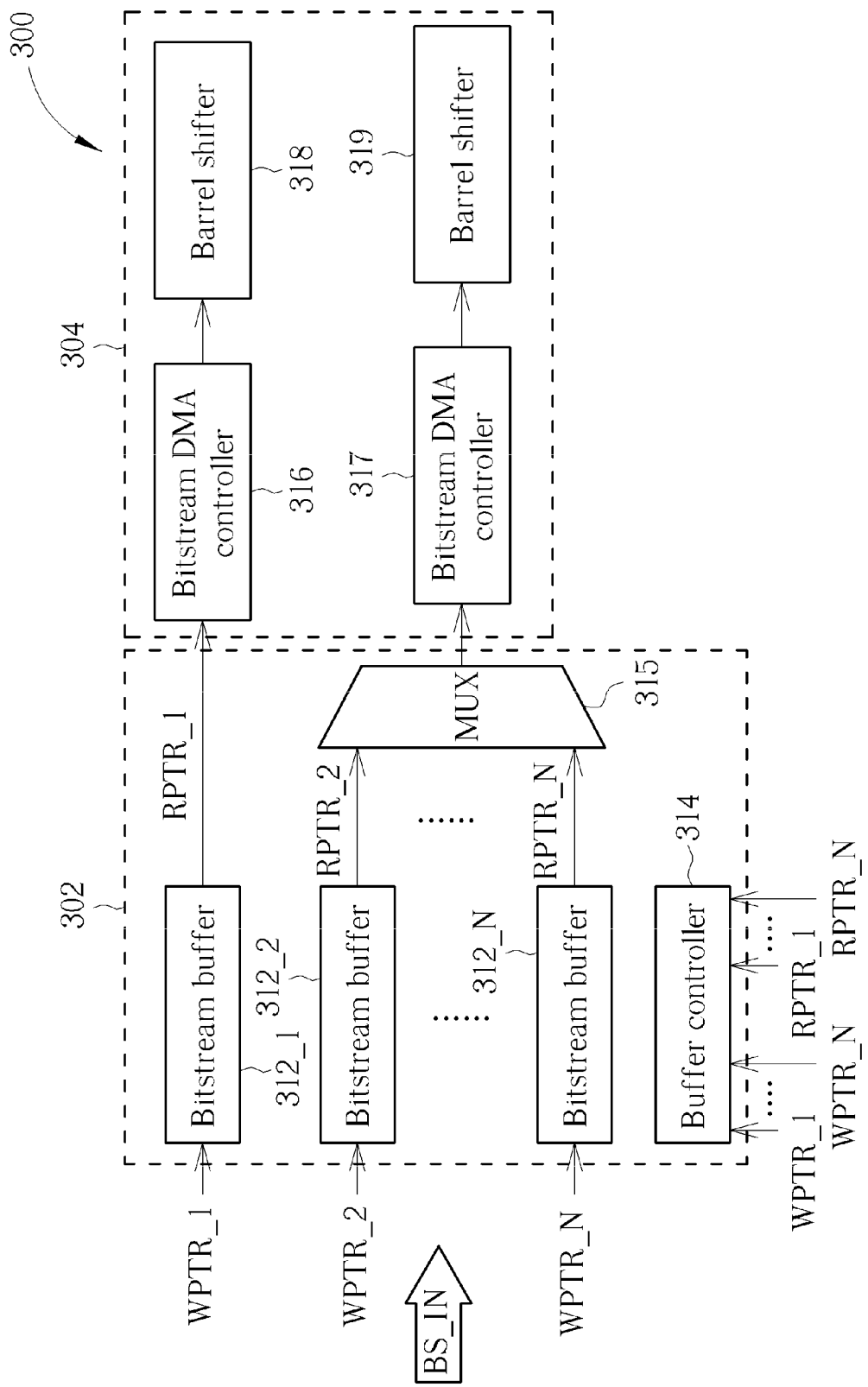
FIG. 3 is a diagram illustrating a video/image decoding system according to a first exemplary embodiment of the present invention.

FIG. 3 is a diagram illustrating a video/image decoding system according to a first exemplary embodiment of the present invention. The video/image decoding system 300 includes a buffering apparatus 302 and a decoding apparatus 304. The buffering apparatus 302 is for buffering a multi-partition video/image bitstream BS_IN which transmits a plurality of compressed frames each having a plurality of partitions. In this exemplary embodiment, the buffering apparatus 302 includes a plurality of bitstream buffers 312_1-312_N, a buffer controller 314, and a multiplexer (MUX) 315. The bitstream buffers 312_1-312_N are arranged to buffer data of the partitions 102_1-102_N shown in FIG. 1, respectively. The bitstream data is stored into the bitstream buffers 312_1 -312_N according to write pointers WPTR_1 -WPTR_N, and the bitstream data is read from the bitstream buffers 312_1-312_N according to read pointers RPTR_1 -RPTR_N. More specifically, the write pointer WPTR_1 controls the write address at which the header information/per-macroblock prediction information is stored into the bitstream buffer 312_1, and the read pointer RPTR_1 controls the read address at which the buffered header information/per-macroblock prediction information of the partition 102_1 is read from the bitstream buffer 312_1; the write pointer WPTR_2 controls the write address at which the transform coefficient (e.g., a DCT/WHT coefficient) of the partition 102_2 is stored into the bitstream buffer 312_2, and the read pointer RPTR_2 controls the read address at which the buffered transform coefficient is read from the bitstream buffer 312_2; and the write pointer WPTR_N controls the write address at which the transform coefficient (e.g., a DCT/WHT coefficient) of the partition 102_N is stored into the bitstream buffer 312_N, and the read pointer RPTR_N controls the read address at which the buffered transform coefficient is read from the bitstream buffer 312_N.

In this exemplary embodiment, the bitstream buffers 312_1-312_N may be continuous/discontinuous ring buffers dedicated to buffering data of the partitions 102_1-102_N, respectively, and data is allowed to be fed into a ring buffer when the ring buffer has free storage space (i.e., the write pointer does not catch up the read pointer yet). In one exemplary design, the buffer controller 314 is arranged to monitor the write pointers WPTR_1 -WPTR_N and the read pointers RPTR_1 -RPTR_N of all bitstream buffers 312_1 -312_N at the same time. Therefore, when the buffer controller 314 detects any bitstream buffer that has free space for receiving more data that is not buffered yet, the buffer controller 314 adjusts the corresponding write pointer and allows data that is not buffered yet to be filled into the bitstream buffer.

In another exemplary design, the buffer controller 314 is arranged to only monitor the write pointer and the read pointer of a currently used bitstream buffer in which the buffered data is being decoded. Therefore, when the buffer controller 314 detects that the currently used bitstream buffer has free space for receiving more data that is not buffered yet, the buffer controller 314 adjusts the corresponding write pointer and allows data that is not buffered yet to be filled into the currently used bitstream buffer.

In above-mentioned exemplary designs, a read pointer and a write pointer of a specific bitstream buffer are used to determine/detect whether the specific bitstream buffer is full or empty or to determine/detect how much free storage space remained in the specific bitstream buffer. However, this is for illustrative purposes only, and is not meant to be a limitation of the present invention. Using other means capable of determining/detecting whether the specific bitstream buffer is full or empty or to determining/detecting how much free storage space remained in the specific bitstream buffer is also feasible.

Regarding the decoding apparatus 304, it includes a plurality of bitstream direct memory access (DMA) controllers 316, 317, and a plurality of barrel shifters 318, 319. The bitstream DMA controller 316 is arranged to transmit buffered bitstream data (i.e., header information/per-macroblock prediction information) from the bitstream buffer 312_1 to the barrel shifter 318 via DMA manner, and the barrel shifter 318 is arranged to parse the bitstream data provided by the preceding bitstream DMA controller 316. The bitstream DMA controller 316 is arranged to transmit buffered bitstream data (i.e., coefficient data) from one of the bitstream buffers 312_2-312_N to the barrel shifter 319 via DMA manner, and the barrel shifter 319 is arranged to parse the bitstream data provided by the preceding bitstream DMA controller 317. Therefore, the decoding apparatus 304 shown in FIG. 3 is capable of decoding two partitions simultaneously.

As only one of the coefficient partitions (i.e., partitions 102_2-102_N) is allowed to be decoded by the decoding apparatus 302, the buffering apparatus 302 therefore uses the multiplexer 315 to select one of the bitstream buffers 312_2-312_N as a data source to be accessed by the bitstream DMA controller 317. For example, when the coefficient data of the partition 102_2 is required to be processed at a first time point, the multiplexer 315 couples the bitstream buffer 312_2 to the bitstream DMA controller 317. However, when the coefficient data of the partition 102_3 is required to be processed at a second time point, the multiplexer 315 couples the bitstream buffer 312_3 to the bitstream DMA controller 317. As the requested coefficient data may be guaranteed to be available in the bitstream buffers (e.g., ring buffers) 312_2-312_N if each of the bitstream buffer 312_2-312_N is properly controlled to buffer data to be decoded when there is free storage space, the buffering apparatus 302 is not required to release buffered data of one partition and load requested data in another partition. To put it another way, the decoding performance may be greatly improved due to the buffering mechanism which employs multiple bitstream buffers dedicated to buffering partial data of respective partitions, thus avoiding frequent releasing of buffered data and loading of requested data.

Please note that the circuit configuration shown in FIG. 3 merely serves as one exemplary embodiment of the present invention. Any alternative design that does not depart from the spirit of the present invention falls within the scope of the present invention. For example, the spirit of the present invention is obeyed as long as the buffering apparatus includes multiple bitstream buffers arranged to buffer data of different partitions in the same compressed frame, respectively. For example, in one alternative design, the buffering apparatus 302 is modified to include the bitstream buffer 312_1 used for buffering bitstream data of the partition 102_1, at least one of the bitstream buffers 312_2-312_N used for buffering at least one of the partitions 102_2-102_N, and a single bitstream buffer used for buffering bitstream data of the rest of the partitions 102_2-102_N. In another alternative design, the buffering apparatus 302 is modified to include at least two of the bitstream buffers 312_2-312_N used for buffering at least two of the partitions 102_2-102_N, and a single bitstream buffer used for buffering bitstream data of the partition 102_1 and bitstream data of the rest of the partitions 102_2-102_N. The objective of improving the decoding performance of the decoding apparatus 304 is also achieved.

The decoding performance of the decoding apparatus 304 may be further improved by utilizing a buffering apparatus with a prefetch mechanism employed therein. Please refer to FIG. 4, which is a diagram illustrating a video/image decoding system according to a second exemplary embodiment of the present invention. The major difference between the video/image decoding systems 300 and 400 is that the buffering apparatus 402 shown in FIG. 4 has a prefetch circuit 404 included therein. In this exemplary embodiment, the prefetch circuit 404 includes a prefetch unit 406 and a storage unit 408.

The prefetch unit 406 is arranged to prefetch data from a bitstream buffer in which the coefficient data of a next partition to be processed is stored and store the prefetched data into the storage unit 404 while the decoding apparatus 304 is decoding a current partition, wherein the prefetched data stored in the prefetch unit 408 is read by the decoding apparatus 304 when the decoding apparatus 304 starts decoding the next partition. The storage unit 408 may be an internal buffer of the decoding apparatus 304. Thus, a data access speed of the storage unit 408 could be faster than a data access speed of each of the bitstream buffers 312_2-312_N. For example, the storage unit 408 may be implemented by a register or a static random access memory (SRAM). When the decoding apparatus 304 switches to decoding of the next partition, the time period needed for fetching the coefficient data of the next partition from one of the bitstream buffers 312_2-312_N can be saved/reduced due to the prefetched data available in the storage unit 408. In other words, the time period needed for fetching the coefficient data of the next partition is covered in the time period during which the current partition is decoded. Thus, the use of the prefetch circuit 404 is capable of speeding up the overall decoding process.

Figure 4:
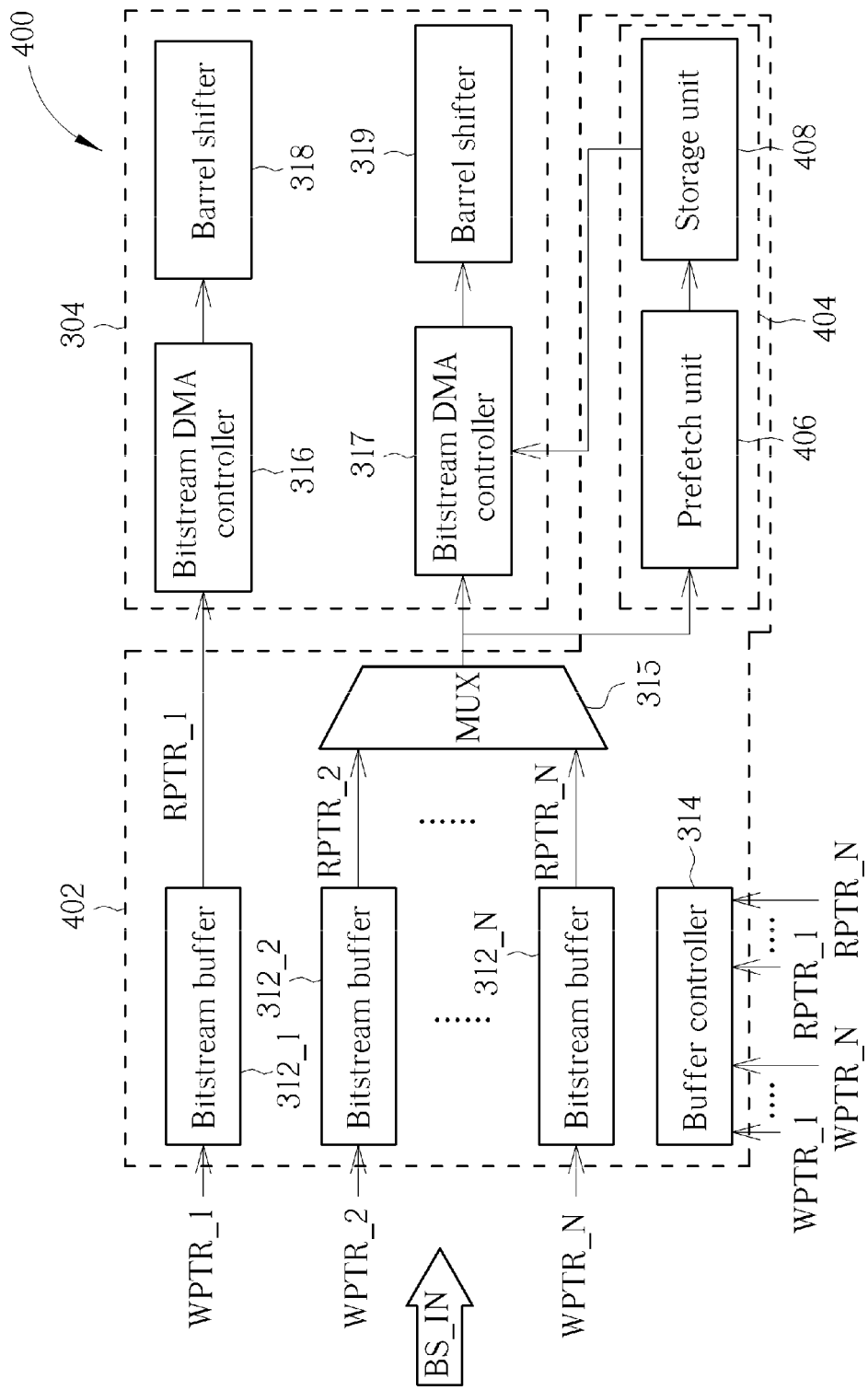
FIG. 4 is a diagram illustrating a video/image decoding system according to a second exemplary embodiment of the present invention.
Figure 5:
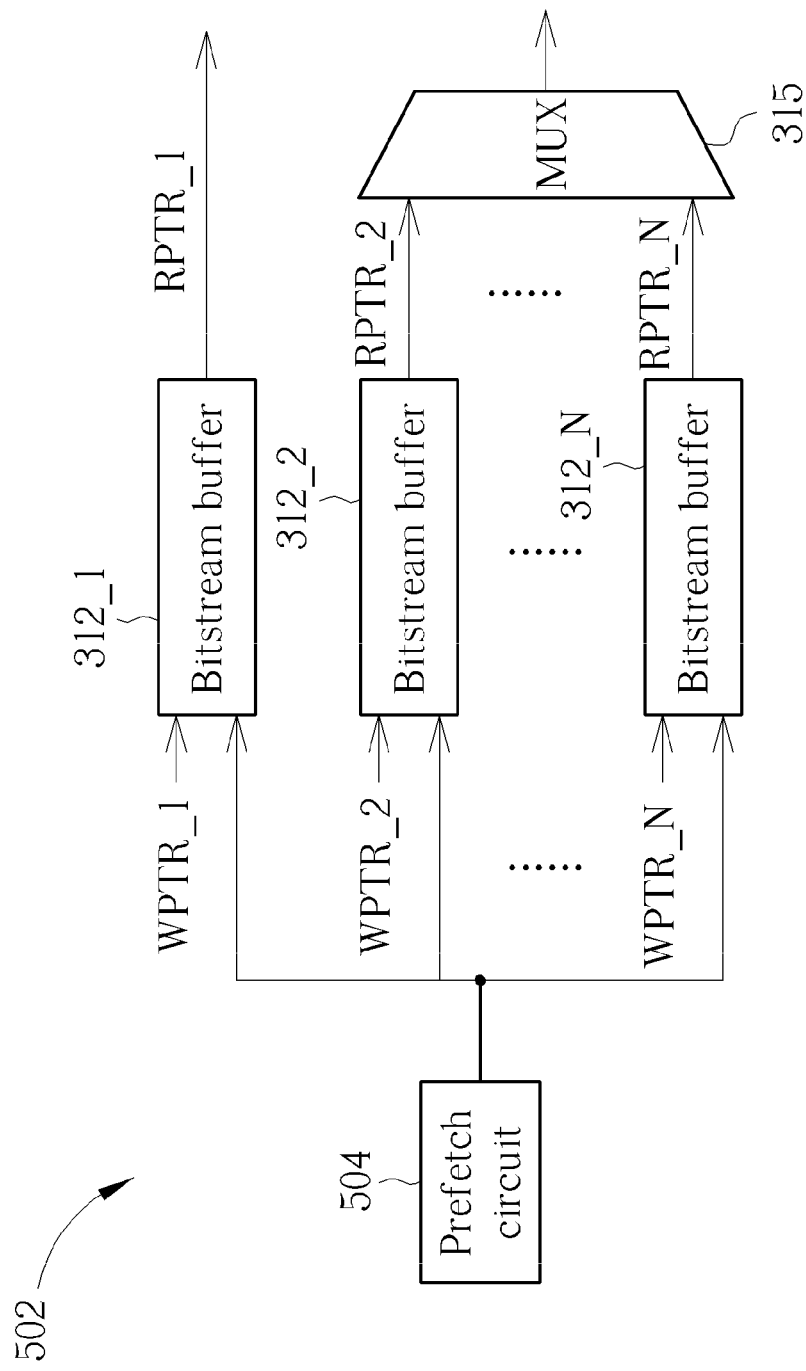
FIG. 5 is a diagram illustrating an alternative design of a buffering apparatus.

In the exemplary embodiment shown in FIG. 4, the prefetch mechanism is employed for prefetching next partition's data to be decoded by the following decoding apparatus. However, the same conception may be applied to prefetching next partition's data to be buffered by one of the bitstream buffers. Please refer to FIG. 5, which is a diagram illustrating an alternative design of the buffering apparatus 302 shown in FIG. 3. The buffering apparatus 502 includes a prefetch circuit 504 and the aforementioned bitstream buffers 312_1-312_N and multiplexer 315. The prefetch circuit 504 is arranged to concurrently monitor one of the bitstreams 312_1-312_N that is buffering coefficient data of a current partition and one or more of the bitstreams 312_1-312_N that are used for buffering coefficient data of next partitions, and requests more data from a previous stage (e.g., Internet, middleware, or disk) when one or more of the bitstreams that are used for buffering coefficient data of next partitions have free storage space available for buffering prefetched data. To put it simply, the prefetch circuit 504 is arrange to prefetch data and store the prefetched data into at least a next partition bitstream buffer while a current partition bitstream buffer is buffering the coefficient data of the current partition processed by the following decoding apparatus. Therefore, with the help of the implemented prefetch mechanism, the bitstream buffering efficiency of the buffering apparatus is improved.

In above exemplary embodiments, the buffering apparatus with the prefetch mechanism employed therein has N bitstream buffers dedicated to buffering data of respective partitions, where N may any positive integer greater than 1. However, the proposed prefetch mechanism may also be employed in a buffering apparatus with a single bitstream buffer used for buffering data of a plurality of partitions.

Figure 6:
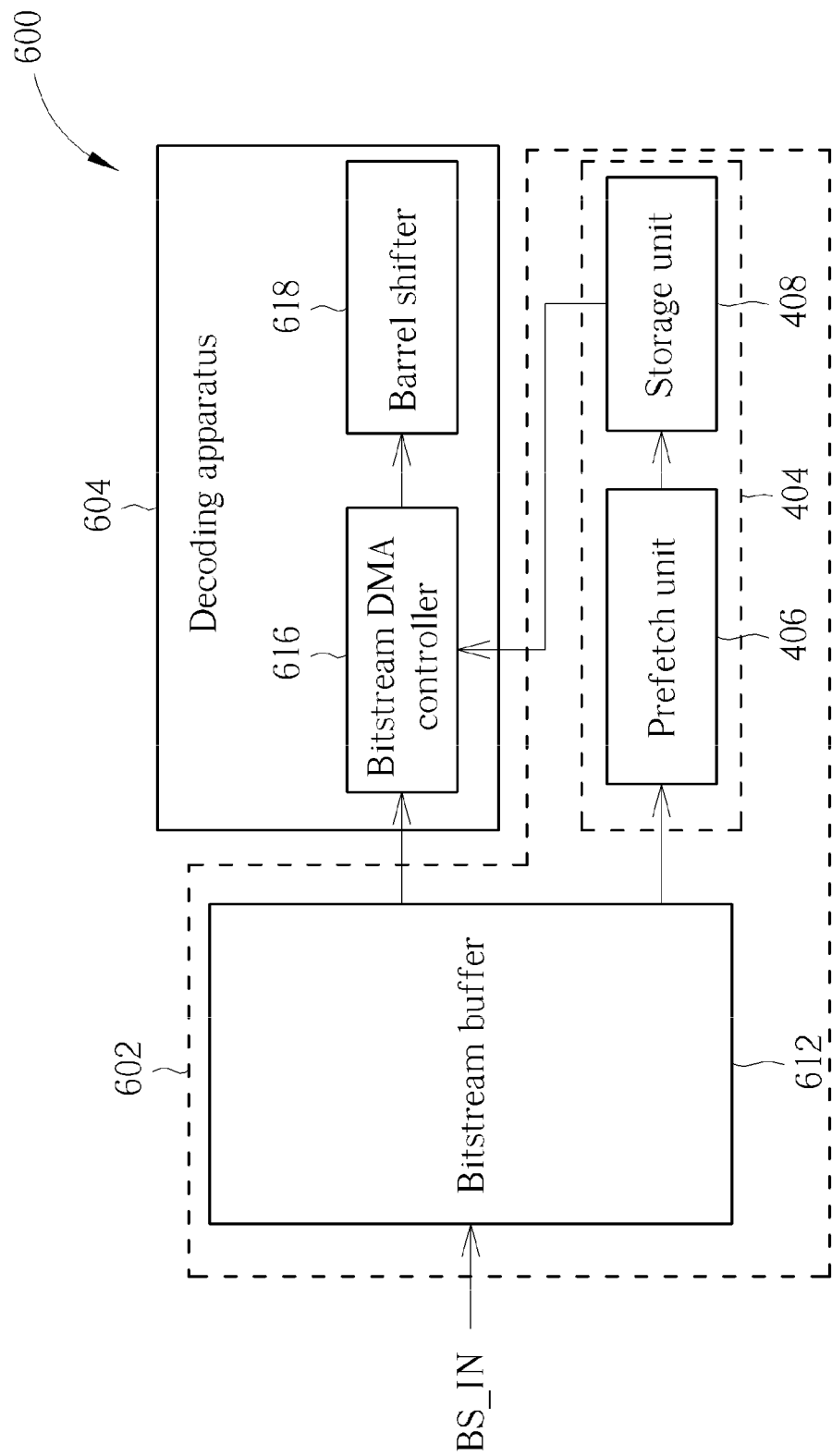
FIG. 6 is a diagram illustrating a video/image decoding system according to a third exemplary embodiment of the present invention.

Please refer to FIG. 6, which is a diagram illustrating a video/image decoding system according to a third exemplary embodiment of the present invention. The video/image decoding system 600 includes a buffering apparatus 602 and a decoding apparatus 604, wherein the buffering apparatus 602 includes a single bitstream buffer 612 and the aforementioned prefetch circuit 404, and the decoding apparatus 604 includes a single bitstream DMA controller 616 and a single barrel shifter 618. In this exemplary embodiment, the single bitstream buffer 612 is not a ring buffer. Besides, the bitstream size of the compressed frame 100 may be large. Thus, in a case where the buffer size of the single bitstream buffer 612 is smaller than the bitstream size of the compressed frame 100, the single bitstream buffer 612 only buffers partial data of the compressed frame 100 (i.e., data of a current partition and next partition(s) of the compressed frame 100). Though the single bitstream buffer 612 may need to switch between partitions for loading requested data from a previous stage (e.g., Internet, middleware, or disk), the use of the prefetch circuit 404 is capable of improving the decoding efficiency of the decoding apparatus 604 by immediately feeding the requested data of the next partition to the decoding apparatus 604 when decoding of the next partition is started.

Moreover, no matter what the buffer size of the single bitstream buffer 612 is (e.g. smaller than/bigger than/equal to the bitstream size of the compressed frame 100), the use of the prefetch circuit 404 is still capable of speeding up the overall decoding process. As a person skilled in the art should readily understand operations of the decoding apparatus 604 and the prefetch circuit 404 after reading above paragraphs, further description is omitted here for brevity.

Figure 7:
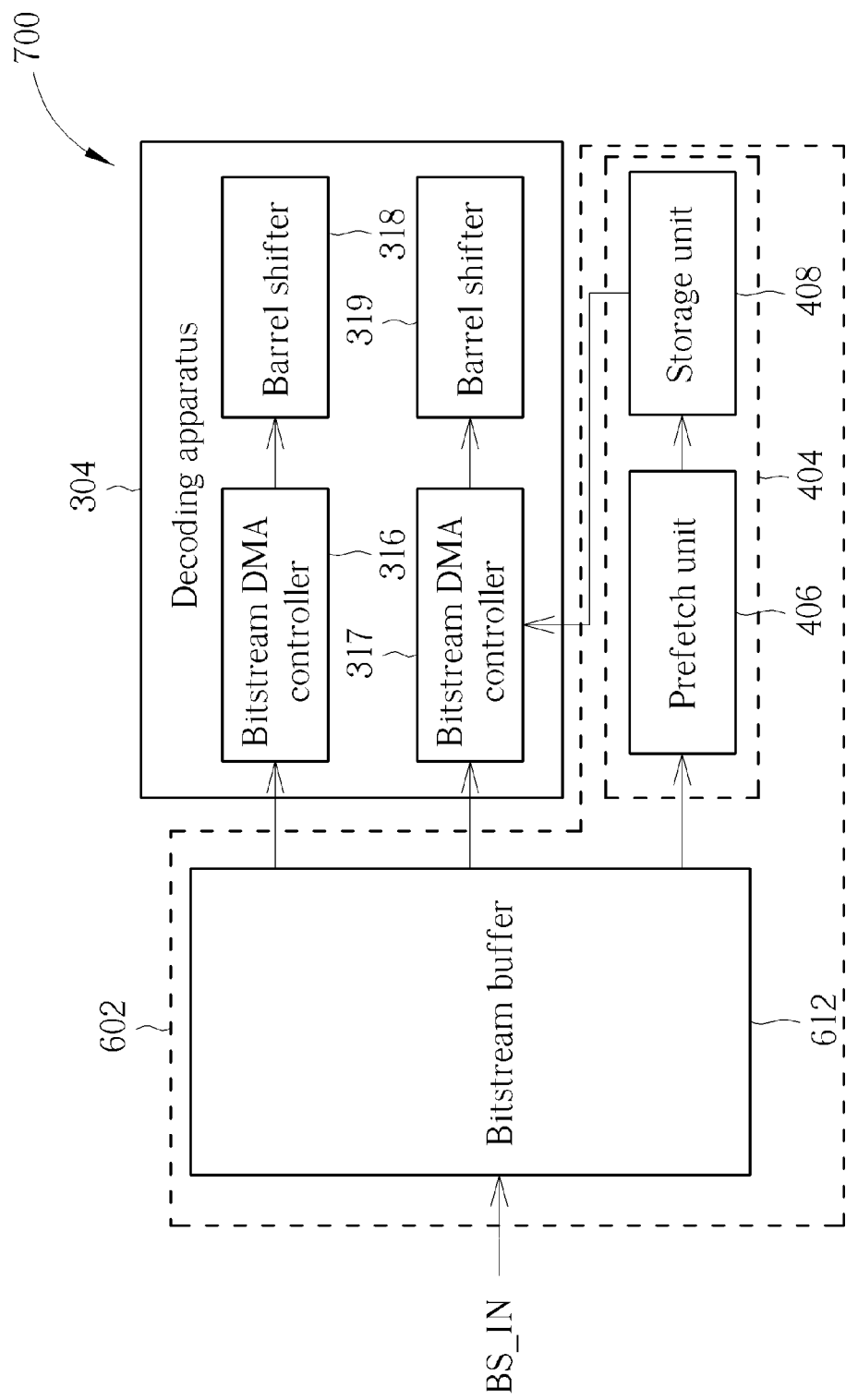
FIG. 7 is a diagram illustrating a video/image decoding system according to a fourth exemplary embodiment of the present invention.

FIG. 7 is a diagram illustrating a video/image decoding system according to a fourth exemplary embodiment of the present invention. The video/image decoding system 700 includes the aforementioned buffering apparatus 602 and decoding apparatus 304. Specifically, the buffering apparatus 602 includes a single bitstream buffer 612 and a prefetch circuit 404, and the decoding apparatus 304 includes a plurality of bitstream DMA controllers 316, 317 and a plurality of barrel shifters 318, 319. Compared to the decoding apparatus 604 shown in FIG. 6, the decoding apparatus 304 shown in FIG. 7 is capable of decoding two partitions simultaneously. The combination of the bitstream DMA controller 316 and barrel shifter 318 is used for processing header information and per-macroblock prediction information contained in the partition 102_1, and the combination of the bitstream DMA controller 317 and barrel shifter 319 is used for processing coefficient data contained in the partitions 102_2-102_N. Similarly, though the single bitstream buffer 612 may need to switch between partitions for loading requested data from a previous stage (e.g., Internet, middleware, or disk), the use of the prefetch circuit 404 is capable of improving the decoding efficiency of the decoding apparatus 304 by immediately feeding the requested data of the next partition to the decoding apparatus 304 when decoding of the next partition is started.

Moreover, no matter what the buffer size of the single bitstream buffer 612 is (e.g. smaller than/bigger than/equal to the bitstream size of the compressed frame 100), the use of the prefetch circuit 404 is still capable of speeding up the overall decoding process. As a person skilled in the art should readily understand operations of the decoding apparatus 604 and the prefetch circuit 404 after reading above paragraphs, further description is omitted here for brevity.

Please note that the above-mentioned exemplary embodiments are directed to buffering and decoding a multi-partition VP8/WebP bitstream. However, this is not meant to be a limitation of the present invention. The proposed buffering mechanism and/or prefetch mechanism may be employed for processing any multi-partition based bitstream.

Figure 8:
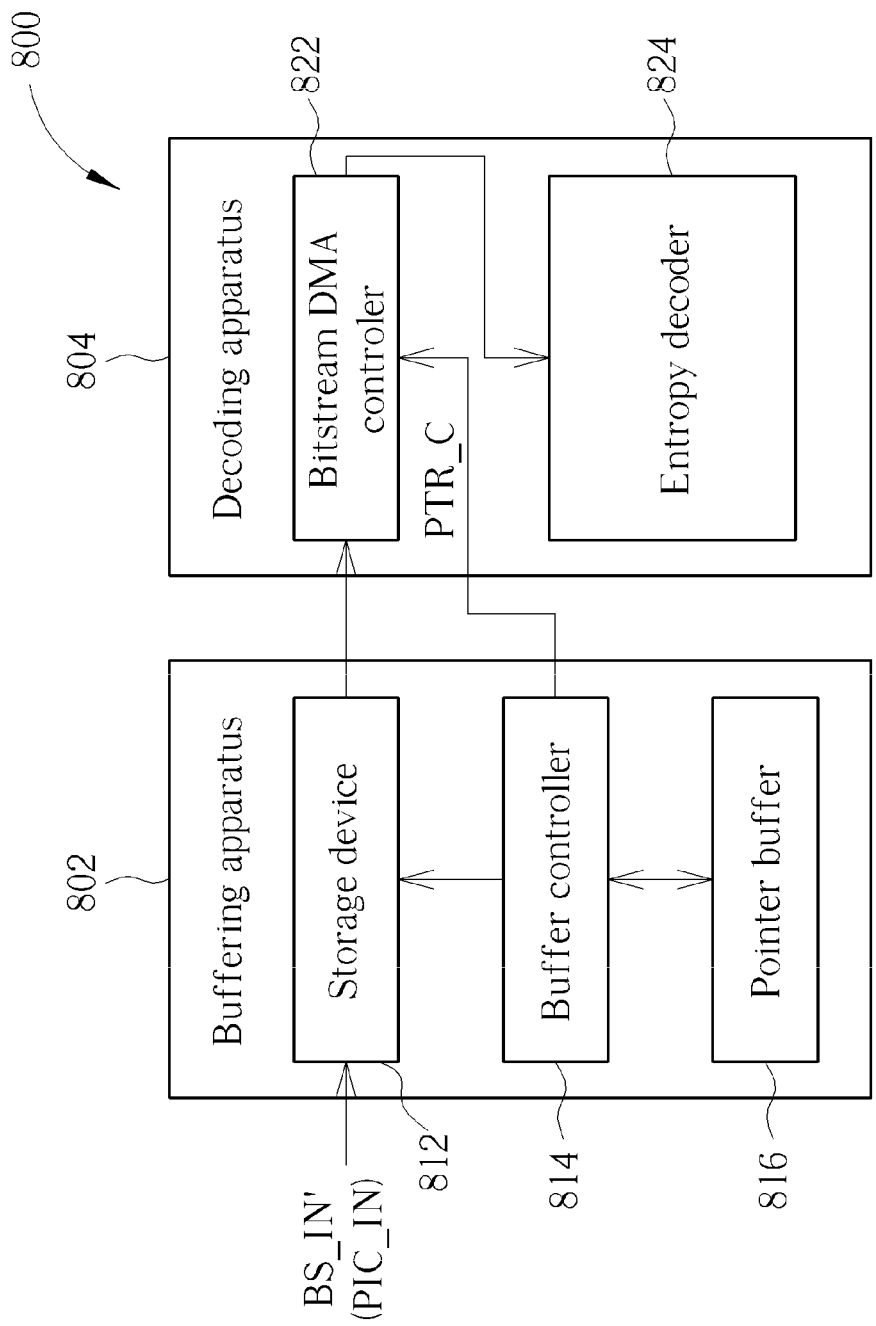
FIG. 8 is a diagram illustrating a video/image decoding system according to a fifth exemplary embodiment of the present invention.

FIG. 8 is a diagram illustrating a video/image decoding system according to a fifth exemplary embodiment of the present invention. By way of example, the video/image decoding system 800 may be employed to process a multi-tile video/image bitstream BS_IN' complying with an HEVC specification or a JPEG-XR specification. As a multi-tile encoded picture of a JPEG-XR bitstream has a tile configuration similar to that of a multi-tile encoded picture of an HEVC bitstream, the multi-tile JPEG-XR bitstream may be processed using the proposed buffering and/or decoding method applied to the multi-tile HEVC bitstream. The video/image decoding system 800 includes a buffering apparatus 802 and a decoding apparatus 804. The buffering apparatus 802 is for buffering the multi-tile video/image bitstream BS_IN which transmits a plurality of compressed/encoded frames PIC_IN each having a plurality of tiles. In this exemplary embodiment, the buffering apparatus 802 includes a storage device 812, a buffer controller 814, and a pointer buffer 816, where the storage device 811 may include one or more bitstream buffers, depending upon actual design consideration. The multi-tile video/image bitstream BS_IN is stored into the storage device 812 under the control of the buffer controller 814. Specifically, the pointer buffer 816 may store a write pointer and one or more read pointers for each bitstream buffer implemented in the storage device 811, and the buffer controller 814 refers to the write pointer and the read pointer to determine whether the corresponding bitstream buffer has free storage space for accommodating data of the multi-tile video/image bitstream BS_IN.

The decoding apparatus 804 is used to decode each multi-tile encoded picture PIC_IN transmitted via the multi-tile video/image bitstream BS_IN'. In this embodiment, the decoding apparatus 804 includes a bitstream DMA controller 822 and an entropy decoder 824. In addition to controlling data buffering of the multi-tile video/image bitstream BS_IN in the storage device 812, the buffer controller 814 further outputs a read pointer PTR_C to inform the bitstream DMA controller 822 of the access position of the requested data (e.g., an LCU/TB/MB to be decoded) in the storage device 812. Hence, the bitstream DMA controller 822 refers to the currently used read pointer PTR_C to transfer the requested data from the storage device 812 to the entropy decoder 824 for entropy decoding. It should be noted that the read pointer PTR_C will be updated each time a requested data (i.e., one requested LCU/TB/MB) has been read from the storage device 812.

It should be noted that the proposed read pointer maintenance scheme may be employed by a decoding operation of independent tiles or a decoding operation of dependent tiles. In the following, an example of decoding independent tiles is provided for illustrative purposes only, and is not meant to be a limitation of the present invention.

Figure 9:
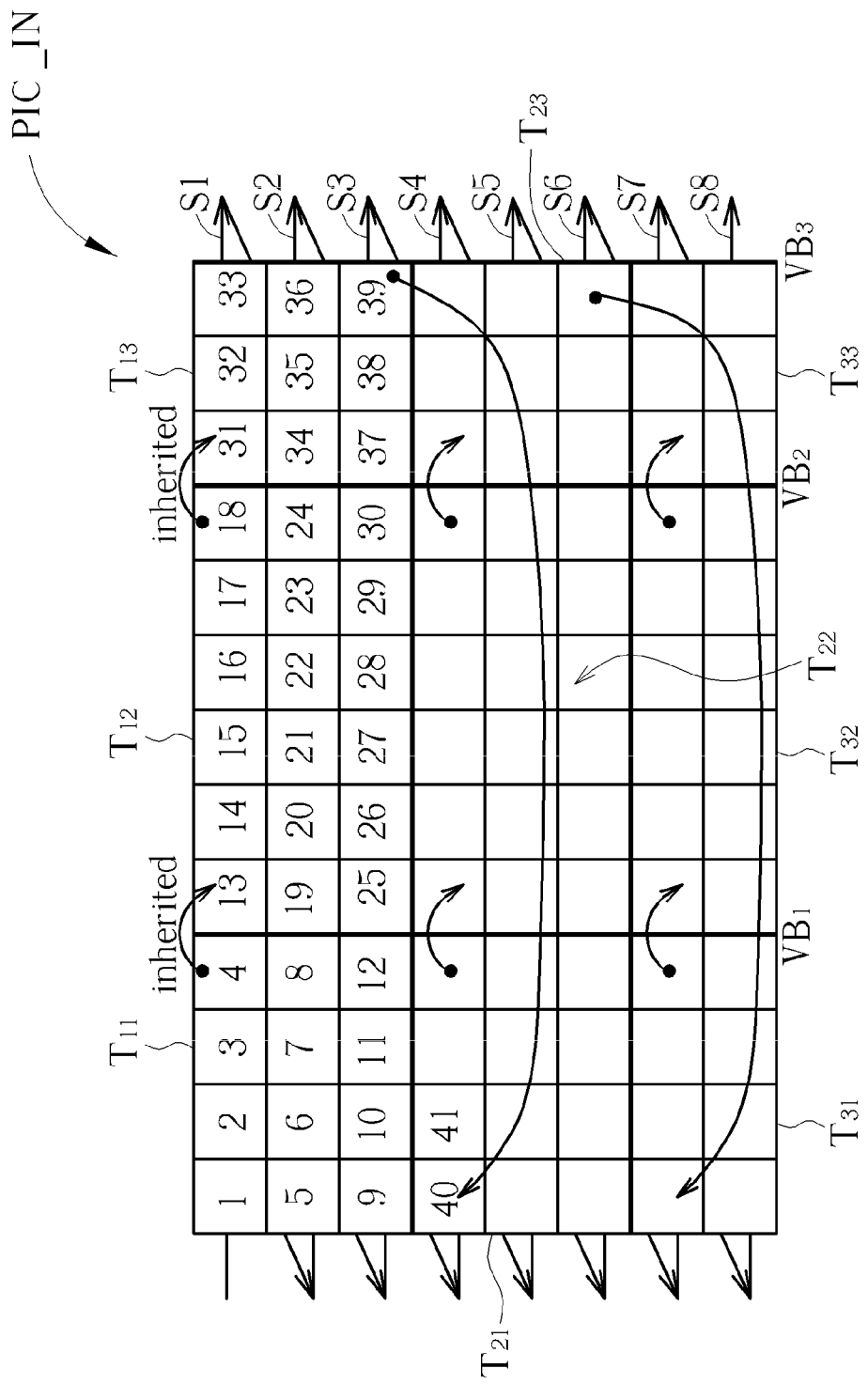
FIG. 9 is a diagram illustrating an exemplary entropy decoding operation performed by the entropy decoder shown in FIG. 8.

Please refer to FIG. 9, which is a diagram illustrating an exemplary entropy decoding operation performed by the entropy decoder 824 shown in FIG. 8. Suppose that a multi-tile encoded picture PIC_IN to be decoded is derived from a multi-tile HEVC bitstream. Hence, the multi-tile encoded picture PIC_IN is partitioned into a plurality of tiles (e.g., nine dependent tiles $T_{11}$-$T_{33}$ in this embodiment). Each of the tiles $T_{11}$-$T_{33}$ is composed of a plurality of LCUs/TBs. If a conventional decoding manner is employed, the LCU/TB index values shown in FIG. 9 indicate the conventional decoding order of the LCUs/TBs included in the multi-tile encoded picture PIC_IN. Specifically, regarding a conventional decoder design, the decoding order in a multi-tile encoded picture with tiles has a raster scan sequence for LCUs/TBs in each tile and a raster scan sequence for the tiles. To put it another way, the conventional decoding order is identical to a transmission order of the LCUs/TBs included in the multi-tile encoded picture PIC_IN. That is, the LCUs/TBs in the same tile are successively transmitted in a raster scan sequence, and the tiles are successively transmitted in a raster scan sequence. In contrast to the conventional decoder design, the proposed decoder design of the present invention has the entropy decoder 824 configured to decode all LCUs/TBs of the whole multi-tile encoded picture PIC_IN in a raster scan manner, where the decoding order includes successive decoding sequences S1-S8 as shown in FIG. 9. For example, the LCUs/TBs, located at the first row shown in FIG. 9 and belonging to different tiles $T_{11}$, $T_{12}$ and $T_{13}$, are sequentially decoded from the left-most LCU/TB to the right-most LCU/TB as indicated by the decoding sequence S1; the LCUs/TBs, located at the second row shown in FIG. 9 and belonging to different tiles $T_{11}$, $T_{12}$ and $T_{13}$, are sequentially decoded from the left-most LCU/TB to the right-most LCU/TB as indicated by the decoding sequence S2 following the decoding sequence S1; and the LCUs/TBs, located at the third row shown in FIG. 9 and belonging to different tiles $T_{11}$, $T_{12}$ and $T_{13}$, are sequentially decoded from the left-most LCU/TB to the right-most LCU/TB as indicated by the decoding sequence S3 following the decoding sequence S2. In other words, the proposed decoding order employed the entropy decoder 824 is different from the transmission order of the LCUs/TBs included in the multi-tile encoded picture PIC_IN.

In this embodiment, data of the LCUs/TBs is encoded using a context-based adaptive binary arithmetic coding (CABAC) algorithm. Hence, the context model, which is a probability model, should be properly selected and updated during the entropy decoding of the multi-tile encoded picture PIC_IN. It should be noted that the entropy decoder 824 is configured to initialize the CABAC statistics at the first LCU/TB of each tile. That is, the CABAC statistics at the first LCU/TB of a current tile may be inherited from the CABAC statistics at a specific LCU/TB of a previous tile horizontally adjacent to the current tile, where the first LCU/TB and the specific LCU/TB are horizontally adjacent to each other and located at opposite sides of a tile boundary (i.e., a vertical/column boundary) between the current tile and the previous tile. As can be seen from FIG. 9, the initial CABAC statistics at the first LCU/TB indexed by "13" in the tile $T_{12}$ is inherited from the CABAC statistics updated at the LCU/TB indexed by "4" in the tile $T_{11}$; similarly, the initial CABAC statistics at the first LCU/TB indexed by "31" in the tile $T_{13}$ is inherited from the CABAC statistics updated at the LCU/TB indexed by "18" in the tile $T_{12}$. The tiles $T_{11}$-$T_{13}$ are horizontally adjacent tiles, i.e., horizontal partitions. However, the tiles $T_{11}$, $T_{21}$, and $T_{31}$ are vertically adjacent tiles, i.e., vertical partitions. Regarding the tile $T_{21}$ which is vertically adjacent to the tile $T_{11}$, the initial CABAC statistics at the first LCU/TB indexed by "40" in the tile $T_{21}$ would be inherited from the CABAC statistics updated at the last LCU/TB indexed by "39" in the tile $T_{13}$. As the initial setting of the CABAC statistics for the rest of the tiles can be easily deduced by analogy, further description is omitted for brevity.

As the entropy decoder 824 employs the decoding order including successive decoding sequences S1-S8, the LCUs/TBs in the same tile are not decoded continuously due to the fact that the entropy decoder 824 starts decoding a portion of a current tile after decoding a portion of a previous tile. As can be seen from FIG. 9, after the LCUs/TBs indexed by "1", "2", "3" and "4" of the tile $T_{11}$ are successively decoded, the next LCU/TB to be decoded by the entropy decoder 824 would be the first LCU/TB indexed by "13" in the next tile $T_{12}$ rather than the LCU/TB indexed by "5" in the current tile $T_{11}$; after the LCUs/TBs indexed by "13", "14", "15", "16", "17" and "18" of the tile $T_{12}$ are successively decoded, the next LCU/TB to be decoded by the entropy decoder 824 would be the first LCU/TB indexed by "31" in the next tile $T_{13}$ rather than the LCU/TB indexed by "19" in the current tile $T_{12}$; and after the LCUs/TBs indexed by "31", "32" and "33" of the tile $T_{13}$ are successively decoded, the next LCU/Tb to be decoded by the entropy decoder 824 would be the first LCU/TB indexed by "5" in the previously processed tile $T_{11}$ rather than the LCU/TB indexed by "34" in the current tile $T_{13}$. Though each tile has a plurality of LCUs/TBs successively transmitted and stored into the storage device, the LCUs/TBs of the same tile are not decoded continuously due to the proposed decoding order shown in FIG. 9. Hence, the buffer controller 814 should be properly designed for offering desired read pointer maintenance of the buffering apparatus 802.

Figure 10:
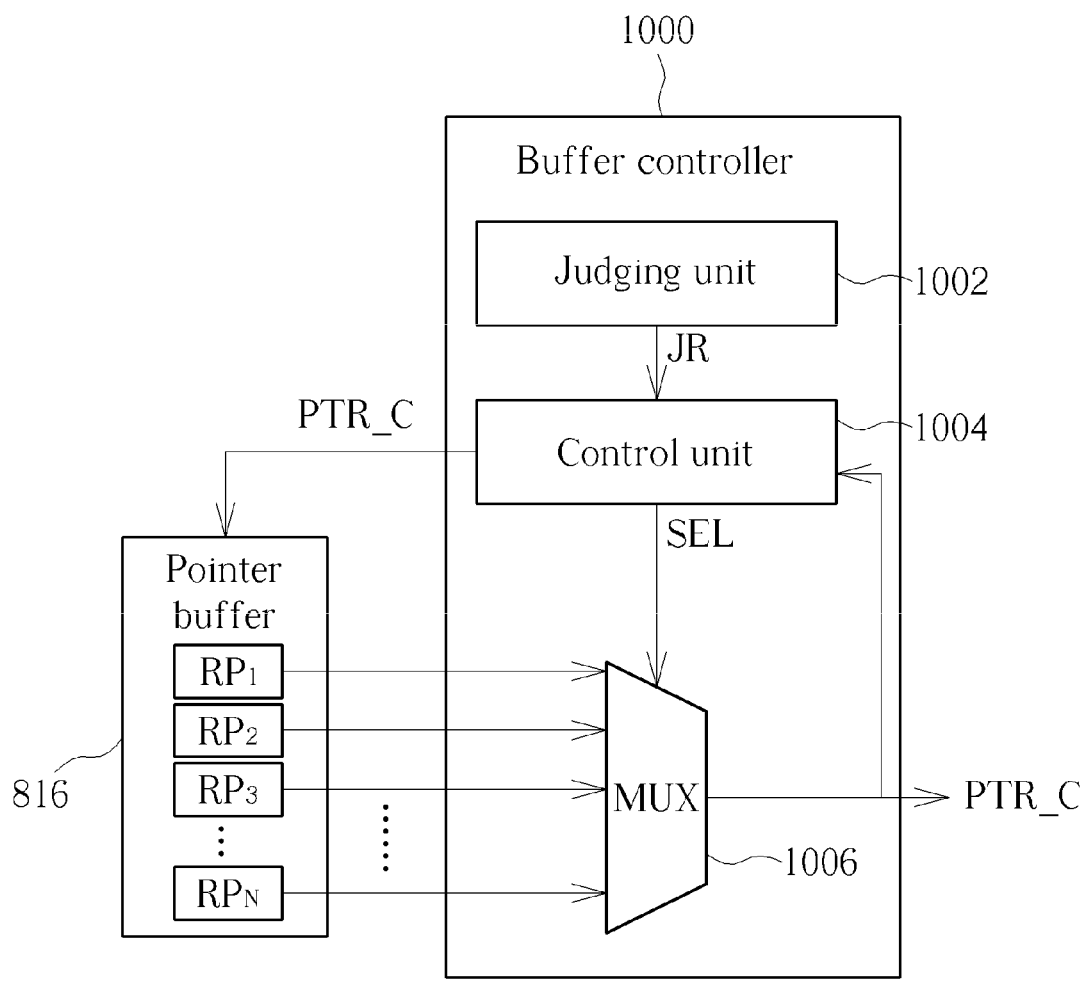
FIG. 10 is a diagram illustrating a buffer controller according to an embodiment of the present invention.

Please refer to FIG. 10, which is a diagram illustrating a buffer controller according to an embodiment of the present invention. The buffer controller 814 shown in FIG. 8 may be realized by the buffer controller 1000 shown in FIG. 10. In this embodiment, the buffer controller 1000 includes a judging unit 1002, a control unit 1004, and a multiplexer (MUX) 1006. The judging unit 1002 is arranged for judging if decoding of a current tile of the multi-tile encoded picture PIC_IN encounters a tile boundary (e.g., a right vertical/column boundary) of the current tile, and accordingly generating a judgment result JR. For example, the judging unit 1002 may actively monitor the entropy decoding operation performed by the decoding apparatus 804 to judge if the tile boundary is encountered, or may passively receive an entropy decoding status provided by the decoding apparatus 804 to judge if the tile boundary is encountered.

The control unit 1004 is arranged for storing a currently used read pointer PTR_C into the pointer buffer 816 and loading a selected read pointer from the pointer buffer 816 to act as the currently used read pointer PTR_C when the judgment result JR indicates that the tile boundary is encountered, where the selected read pointer loaded from the pointer buffer 816 may be a read pointer of a next tile to be decoded immediately after the current tile. As shown in FIG. 10, the control unit 1004 generates a selection signal SEL to the MUX 1006 to control which one of the read pointers $RP_1$, $RP_2$, $RP_3$-$RP_N$ maintained in the pointer buffer 816 is selected and loaded as the currently used read pointer PTR_C.

By way of example, but not limitation, the number of read pointers maintained in the pointer buffer 816 during entropy decoding of the multi-tile encoded picture PIC_IN depends on the partitioning setting of the multi-tile encoded picture PIC_IN. For example, when the multi-tile encoded picture PIC_IN has N horizontally adjacent partitions (i.e., N horizontal partitions/tiles at the same row), the number of read pointers maintained in the pointer buffer 816 during entropy decoding of the multi-tile encoded picture is equal to N. Regarding the example shown in FIG. 9, N is equal to 3. Hence, there are 3 read pointers (e.g., $RP_1$-$RP_3$) concurrently maintained in the pointer buffer 816, where each of the read pointers indicates an access position in the storage device 812.

Figure 11:
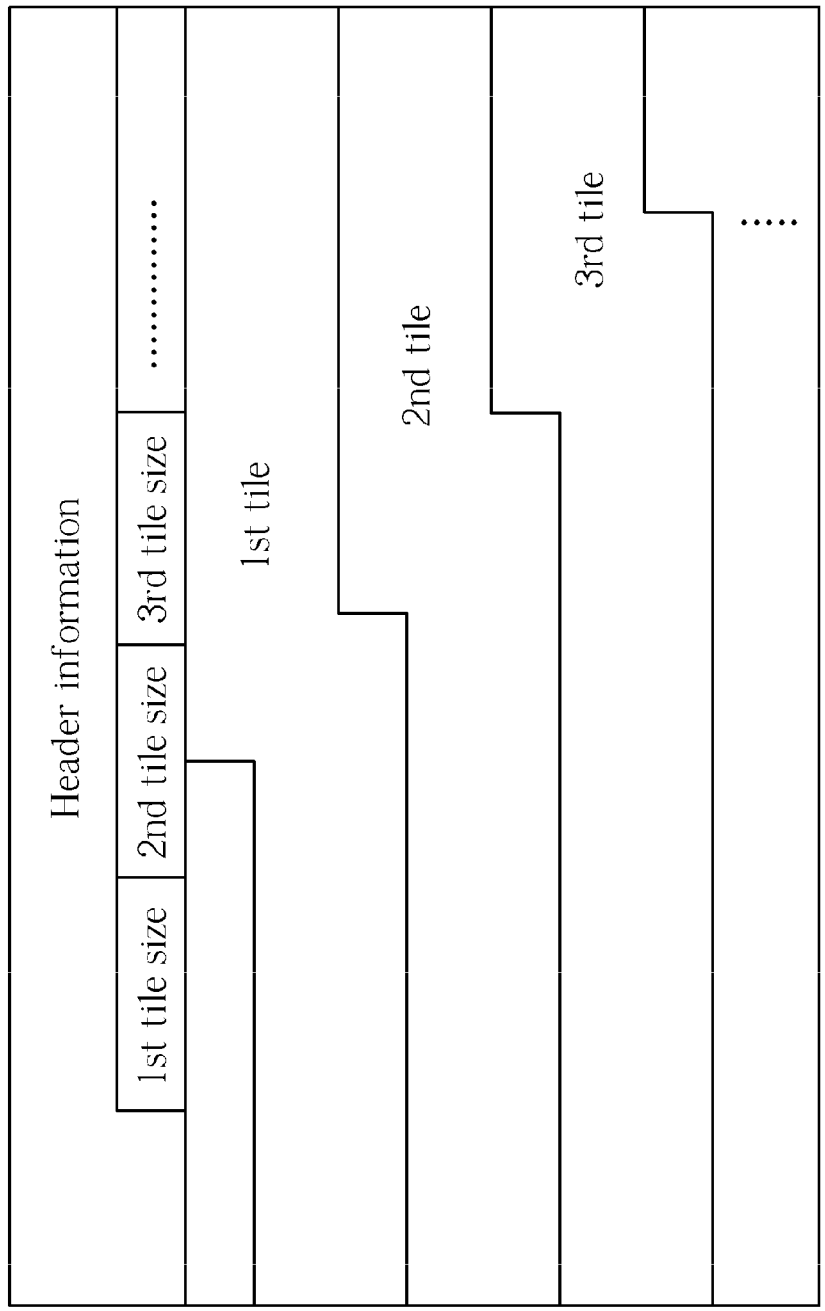
FIG. 11 is a diagram illustrating a sketch map of a multi-tile video/image bitstream according to an embodiment of the present invention.

The read pointers $RP_1$-$RP_N$ may be initialized by referring to the header information transmitted via the multi-tile video/image bitstream BS_IN'. FIG. 11 is a diagram illustrating a sketch map of the multi-tile video/image bitstream BS_IN' according to an embodiment of the present invention. The tile size of each tile included in the multi-tile encoded picture PIC_IN is recorded in the header information section. These tile sizes provide the information needed for calculating the offset (e.g., an entry point offset) of the nth tile from the start of the multi-tile encoded picture PIC_IN. Thus, when the tiles are sequentially stored into bitstream buffer(s) of the storage device 812, the storage location of the start of each tile can be readily obtained and used for setting the initial value of a corresponding read pointer in the pointer buffer 816.

Figure 12:
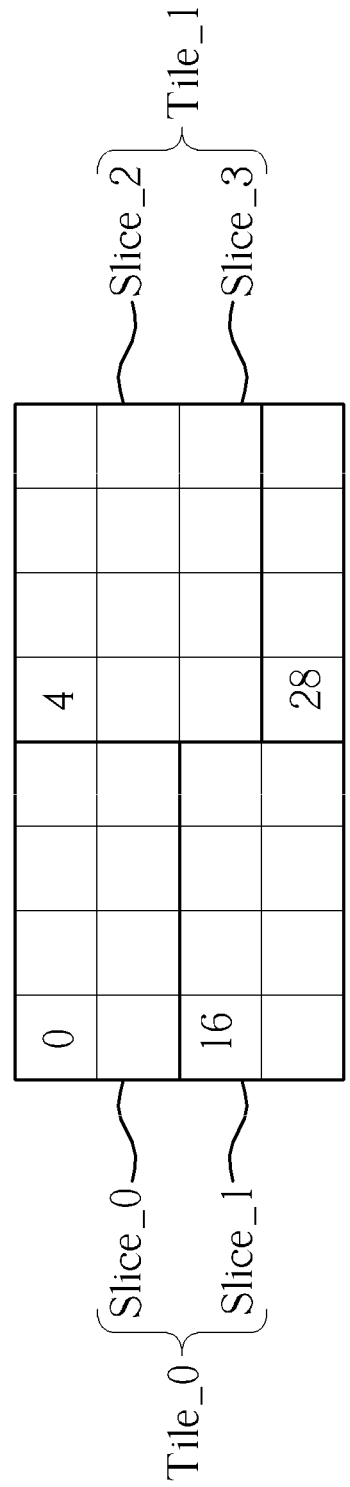
FIG. 12 is a diagram illustrating a plurality of tiles each including a plurality of slices according to an embodiment of the present invention.
Figure 13:
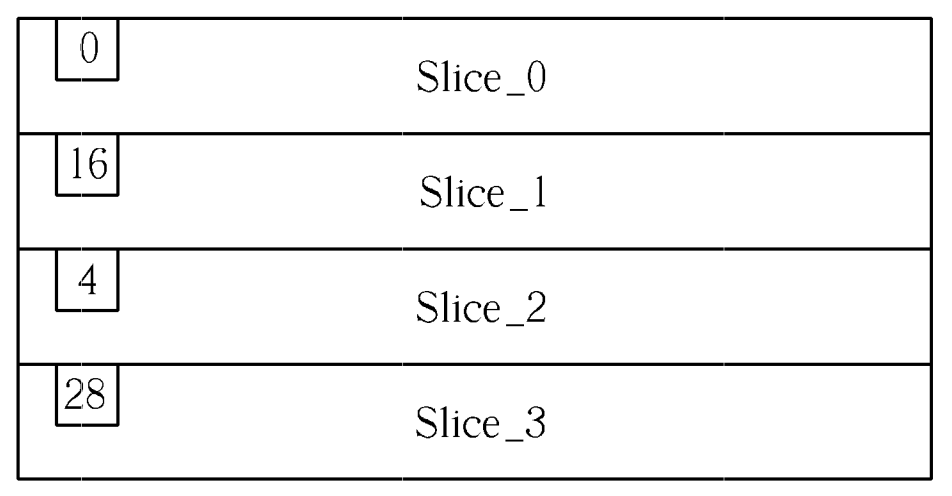

In accordance with the HEVC specification, all slices within a tile shall be complete or all tiles within a slice shall be complete. The HEVC bitstream structure shown in FIG. 11 is for a slice having a plurality of tiles included therein. However, based on the HEVC specification, it is possible that one tile may have a plurality of slices included therein. The aforementioned entry point offset based initialization method for the read pointers $RP_1$-$RP_N$ is not applicable to the case where one tile has a plurality of slices included therein. Please refer to FIG. 12 in conjunction with FIG. 13. FIG. 12 is a diagram illustrating a plurality of tiles each including a plurality of slices according to an embodiment of the present invention. FIG. 13 is a diagram illustrating another sketch map of the multi-tile video/image bitstream BS_IN' according to an embodiment of the present invention. As shown in FIG. 12, one tile Tile_0 includes a plurality of slices Slice_0 and Slice_1, and another tile Tile_1 includes a plurality of slices Slice_2 and Slice_3. As shown in FIG. 13, the slices Slice_0-Slice_3 are sequentially transmitted and stored into bitstream buffer(s) of the storage device 812. Regarding the case where one tile has a plurality of slices included therein, the present invention proposes initializing the read pointers $RP_1$-$RP_N$ by referring to the slice addresses. Thus, when the slices are sequentially stored into bitstream buffer(s) of the storage device 812, the storage location of the start of each tile can be readily obtained from the slice address of the first slice included in the tile. For example, the slice address of the slice Slice_2 of the tile Tile_1 can be used for setting the initial value of a corresponding read pointer in the pointer buffer 816. The same objective of initializing a read pointer of each tile is achieved.

Figure 14:
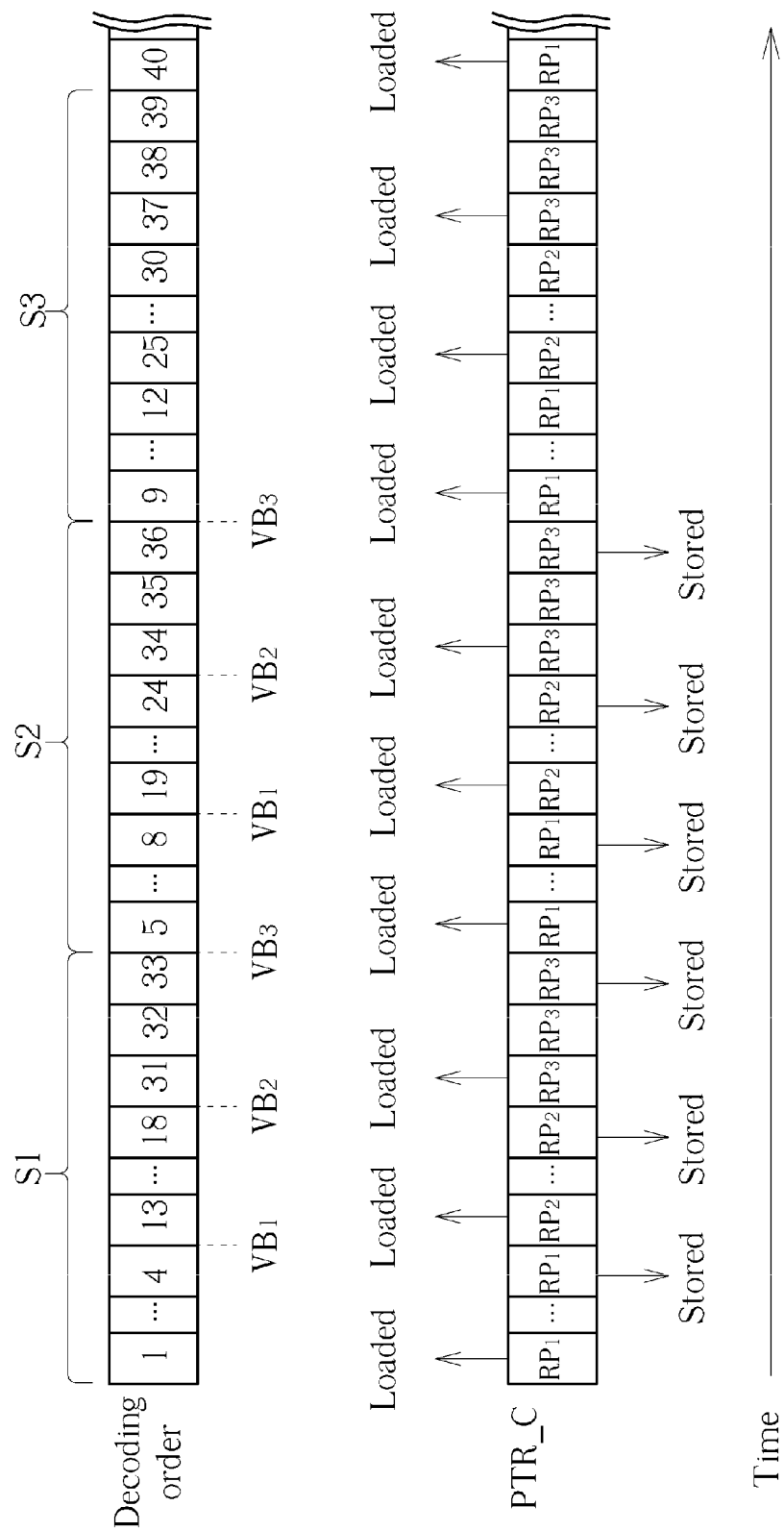
FIG. 14 is a diagram illustrating an exemplary read pointer maintenance operation of the buffering apparatus.

An exemplary read pointer maintenance operation of the buffering apparatus 802 is described with reference to FIG. 14. Supposing that the multi-tile encoded picture PIC_IN has the partition setting shown in FIG. 9, the number of maintained read pointers is equal to 3 (i.e., N=3). In the beginning, the read pointer $RP_1$ with an initial value is loaded via the MUX 1006 to act as the currently used read pointer PTR_C referenced by the bitstream DMA controller 822 for reading the LCU/TB indexed by "1" from the storage device 812. When the entropy decoding of the tile $T_{11}$ encounters a tile boundary (e.g., a vertical/column boundary $VB_1$) after decoding the LCU/TB indexed by "18", the currently read pointer PTR_C pointing to an access location of the subsequent LCU/TB indexed by "5" is stored into the pointer buffer 816 to update the read pointer $RP_1$ maintained in the pointer buffer 816, and the read pointer $RP_2$ with an initial value is loaded via the MUX 1006 to act as the currently used read pointer PTR_C referenced by the bitstream DMA controller 822 for reading the LCU/TB indexed by "13" from the storage device 812. When the entropy decoding of the tile $T_{12}$ encounters a tile boundary (e.g., a vertical/column boundary $VB_2$) after decoding the LCU/TB indexed by "18", the currently read pointer PTR_C pointing to an access location of the subsequent LCU/TB indexed by "19" is stored into the pointer buffer 816 to update the read pointer $RP_2$ maintained in the pointer buffer 816, and the read pointer $RP_3$ is loaded via the MUX 1006 to act as the currently used read pointer PTR_C referenced by the bitstream DMA controller 822 for reading the LCU/TB indexed by "31" from the storage device 812. When the entropy decoding of the tile $T_{13}$ encounters a tile boundary (e.g., a vertical/column boundary $VB_3$) after decoding the LCU/TB indexed by "33", the currently read pointer PTR_C pointing to an access location of the subsequent LCU/TB indexed by "34" is stored into the pointer buffer 816 to update the read pointer $RP_3$ maintained in the pointer buffer 816, and the read pointer $RP_1$ is loaded via the MUX 1006 to act as the currently used read pointer PTR_C referenced by the bitstream DMA controller 822 for reading the LCU/TB indexed by "5" from the storage device 812. As a person skilled in the art can readily understand loading and storing of the read pointer referenced for reading the following requested LCUs/TBs by referring to FIG. 9, further description is omitted here for brevity.

The storage device 812 may be implemented using a single bitstream buffer or multiple bitstream buffers. In a case where the storage device 812 is implemented using multiple bitstream buffers, the buffer size can be saved. For example, the multiple bitstream buffers are continuous/discontinuous ring buffers dedicated to buffering LCU/TB/MB data of different tiles, respectively, and the LCU/TB/MB data is allowed to be fed into a ring buffer when the ring buffer has free storage space (i.e., a write pointer of the ring buffer does not catch up a read pointer of the ring buffer yet).

Figure 15:
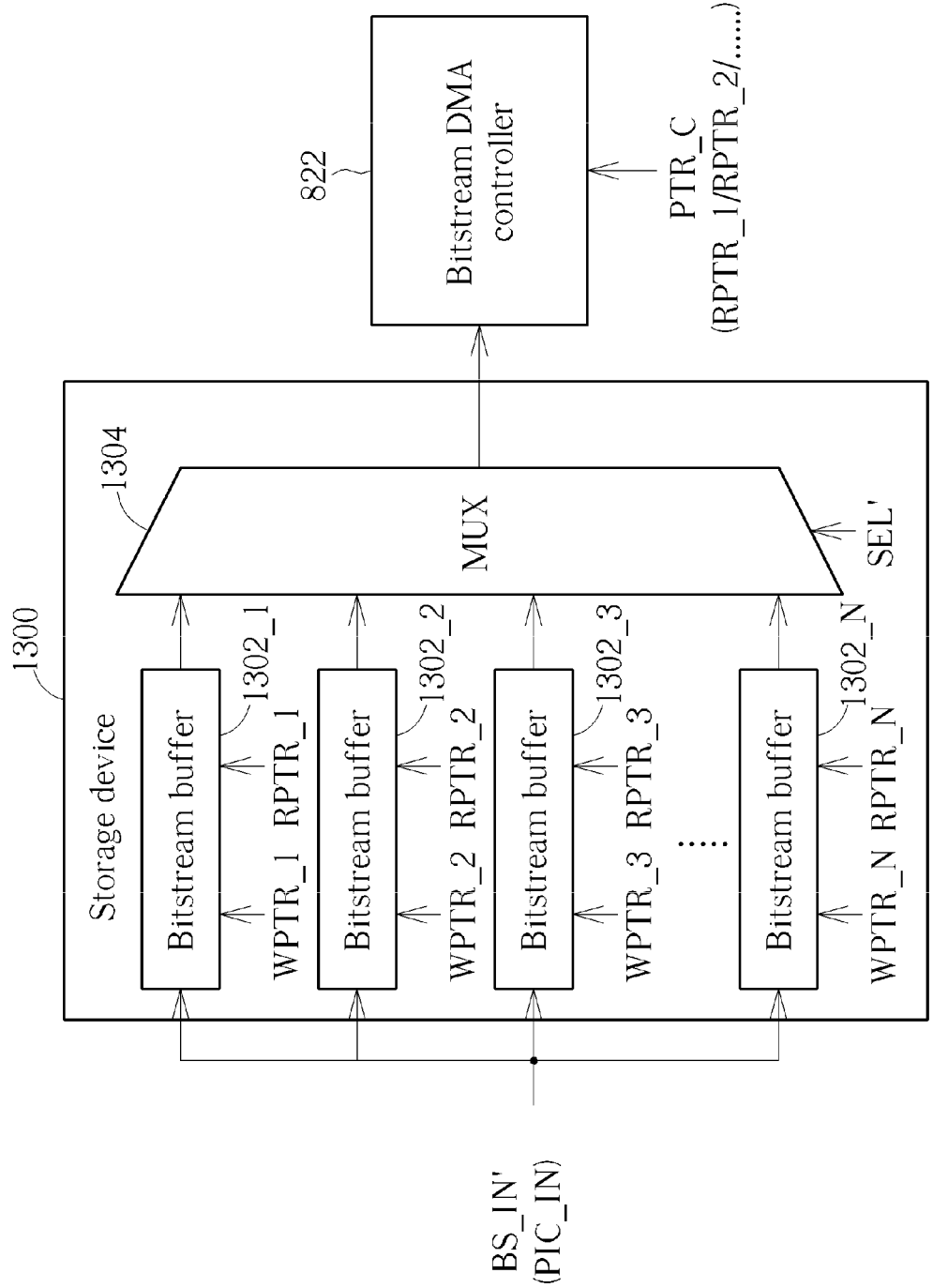
FIG. 15 is a diagram illustrating a storage device according to a first embodiment of the present invention.

FIG. 15 is a diagram illustrating a storage device according to a first embodiment of the present invention. The storage device 812 shown in FIG. 8 may be realized by the storage device 1300 shown in FIG. 15. In this embodiment, the storage device 1300 includes a plurality of bitstream buffers 1302_1, 1302_2, 1302_3-1302_N and a multiplexer (MUX) 1304, wherein the distinct bitstream buffers 1302_1-1302_N provide a plurality of distinct storage spaces for data buffering, respectively. By way of example, but not limitation, the number of bitstream buffers (i.e., storage spaces) implemented in the storage device 1300 depends on the partitioning setting of the multi-tile encoded picture PIC_IN. For example, when the multi-tile encoded picture PIC_IN has N horizontally adjacent partitions (i.e., N horizontal partitions/tiles at the same row), the number of bitstream buffers implemented in the storage device 1300 is equal to N. Regarding the example shown in FIG. 9, N is equal to 3. Hence, there are three bitstream buffers (e.g., 1302_1-1302_3) used for buffering LCU/TB/MB data of three tiles (e.g., $T_{11}$-$T_{13}$, $T_{21}$-$T_{23}$, or $T_{31}$-$T_{33}$), respectively. The bitstream buffers 1302_1-1302_N may be ring buffers.

Besides, the bitstream data is stored into the bitstream buffers 1302_1-1302_N according to write pointers WPTR_1-WPTR_N stored in the pointer buffer 816 and controlled/updated by the buffer controller 814, and the bitstream data is read from the bitstream buffers 1302_1-1302_N according to read pointers RPTR_1-RPTR_N stored in the pointer buffer 816 and controlled/updated by the buffer controller 814. More specifically, in a case where $1^{st}$-$N^{th}$ tiles are horizontally adjacent tiles at the same row, the write pointer WPTR_1 controls the write address at which LCU/MB data of the $1^{st}$ tile is stored into the bitstream buffer 1302_1, and the read pointer RPTR_1 controls the read address at which the buffered LCU/MB data of the $1^{st}$ tile is read from the bitstream buffer 1302_1; the write pointer WPTR_2 controls the write address at which the LCU/MB data of the $2^{nd}$ tile is stored into the bitstream buffer 1302_2, and the read pointer RPTR_2 controls the read address at which the buffered LCU/MB data of the $2^{nd}$ tile is read from the bitstream buffer 1302_2; the write pointer WPTR_3 controls the write address at which the LCU/MB data of the $3^{rd}$ tile is stored into the bitstream buffer 1302_3, and the read pointer RPTR_3 controls the read address at which the buffered LCU/MB data of the $3^{rd}$ tile is read from the bitstream buffer 1302_3; and the write pointer WPTR_N controls the write address at which the LCU/MB of the $N^{th}$ tile is stored into the bitstream buffer 1302_N, and the read pointer RPTR_N controls the read address at which the buffered LCU/MB data of the $N^{th}$ tile is read from the bitstream buffer 1302_N.

The buffer controller 814 further generates a selection signal SEL' to the MUX 1304 to select one of the bitstream buffers 1302_1-1302_N as a data source to be accessed by the bitstream DMA controller 822. For example, when the LCU/MB data of the $1^{st}$ tile is required to be processed by the entropy decoder 824, the MUX 1304 couples the bitstream buffer 1302_1 to the bitstream DMA controller 822. Besides, the buffer controller 814 sets the currently used read pointer PTR_C by the read pointer RPTR_1 of the selected bitstream buffer 1302_1. However, when the LCU/MB data of the $2^{nd}$ tile is required to be processed by the entropy decoder 824, the MUX 1304 couples the bitstream buffer 1302_2 to the bitstream DMA controller 822. Besides, the buffer controller 814 sets the currently used read pointer PTR_C by the read pointer RPTR_2 of the selected bitstream buffer 1302_2. In other words, when the LCU/MB data of a currently decoded tile is retrieved by the bitstream DMA controller 822, the LCU/MB data of other tiles that are not currently decoded is buffered in other bitstream buffers. As the requested LCU/MB data may be guaranteed to be available in the bitstream buffers (e.g., ring buffers) 1302_1-1302_N if each of the bitstream buffer 1302_1-1302_N is properly controlled to buffer data to be decoded when there is free storage space, the buffering apparatus 1300 is not required to release buffered data of one tile and load requested data of another tile. In this way, the decoding performance may be greatly improved due to the buffering mechanism which employs multiple bitstream buffers dedicated to buffering partial data of respective tiles, thus avoiding frequent releasing of buffered data and loading of requested data.

Please note that the circuit configuration shown in FIG. 15 merely serves as one exemplary embodiment of the present invention. Any alternative design that does not depart from the spirit of the present invention also falls within the scope of the present invention. For example, the spirit of the present invention is obeyed as long as the buffering apparatus includes multiple bitstream buffers arranged to buffer data of different tiles in the same multi-tile encoded picture, respectively. For example, in one alternative design, the buffering apparatus 1300 may be modified to include bitstream buffers respectively used for buffering LCU/MB data of some of the tiles in a multi-tile encoded picture, and a single bitstream buffer used for buffering the rest of the tiles in the multi-tile encoded picture. The same objective of improving the decoding performance of the decoding apparatus is also achieved.

The decoding performance of the decoding apparatus 804 may be further improved by utilizing a buffering apparatus with a prefetch mechanism employed therein. Please refer to FIG. 16, which is a diagram illustrating a storage device according to a second embodiment of the present invention. The storage device 812 shown in FIG. 8 may be realized by the storage device 1400 shown in FIG. 16. The major difference between the storage devices 1300 and 1400 is that the buffering apparatus 1400 has a prefetch circuit 1401 included therein. In this exemplary embodiment, the prefetch circuit 1401 includes a prefetch unit 1402 and a storage unit 1404. The prefetch unit 1402 is arranged to prefetch data from a bitstream buffer in which the LCU/TB/MB data of a next tile to be processed is stored and store the prefetched data into the storage unit 1404 while the decoding apparatus 804 is decoding a current tile, wherein the prefetched data stored in the storage unit 1404 is read by the decoding apparatus 804 when the decoding apparatus 804 starts decoding the next tile. By way of example, the storage unit 1404 may be an internal buffer of the decoding apparatus 804. Thus, a data access speed of the storage unit 1404 could be faster than a data access speed of each of the bitstream buffers 1302_1-1302_N. For example, the storage unit 408 may be implemented by a register or a static random access memory (SRAM). When the decoding apparatus 804 switches to decoding of the next tile, the time period needed for fetching the LCU/MB data of the next tile from one of the bitstream buffers 1302_1-1302_N can be saved/reduced due to the prefetched data available in the storage unit 1404. In other words, the time period needed for fetching the LCU/MB data of the next tile is concealed in the time period during which the current tile is decoded. Thus, the use of the prefetch circuit 1401 is capable of speeding up the overall decoding process.

Figure 16:
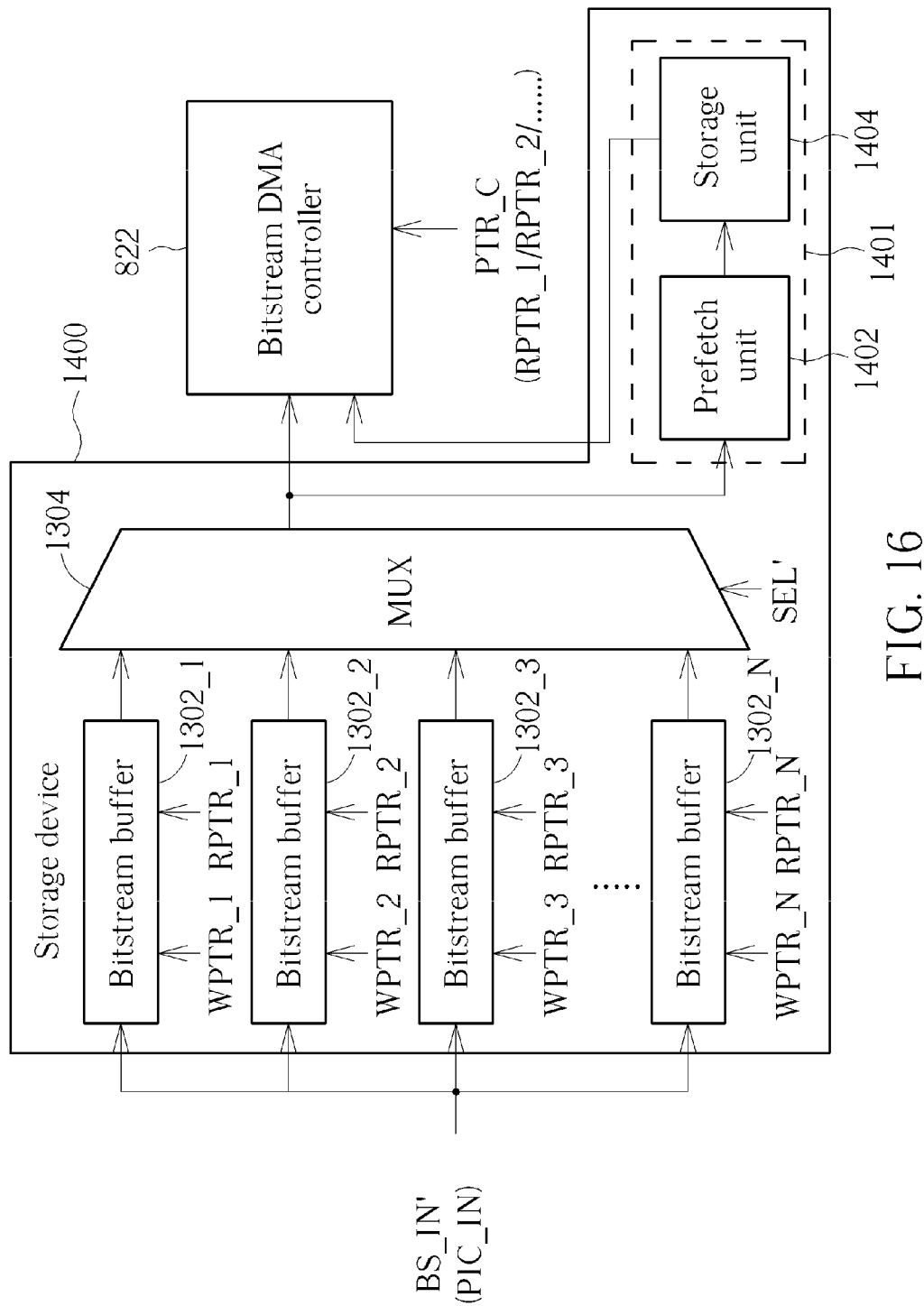
FIG. 16 is a diagram illustrating a storage device according to a second embodiment of the present invention.

In the exemplary embodiment shown in FIG. 16, the prefetch mechanism is employed for prefetching next tile's data to be decoded by the decoding apparatus. However, the same conception may be applied to prefetching next tile's data to be buffered into one of the bitstream buffers. Please refer to FIG. 17, which is a diagram illustrating a storage device according to a third embodiment of the present invention. The storage device 812 shown in FIG. 8 may be realized by the storage device 1500 shown in FIG. 17. The storage device 1500 includes a prefetch circuit 1502, and the aforementioned bitstream buffers 1302_1-1302_N and multiplexer 1304. The prefetch circuit 1502 is arranged to concurrently monitor one of the bitstreams 1302_1-1302_N that is buffering LCU/MB data of a tile which is currently decoded and one or more of the bitstreams 1302_1-1302_N that are used for buffering LCU/MB data of tiles which are not currently decoded, and requests more data from a previous stage (e.g., Internet, middleware, or disk) when the bitstreams, which are used for buffering LCU/MB data of tiles that are not currently decoded, have free storage space available for buffering prefetched data. To put it simply, the prefetch circuit 1502 is arrange to prefetch data and store the prefetched data into at least a next tile bitstream buffer while a current tile bitstream buffer is buffering the LCU/MB data of the current tile processed by the decoding apparatus 804. Therefore, with the help of the implemented prefetch mechanism disposed before the bitstream buffers, the bitstream buffering efficiency of the buffering apparatus is improved.

Figure 17:
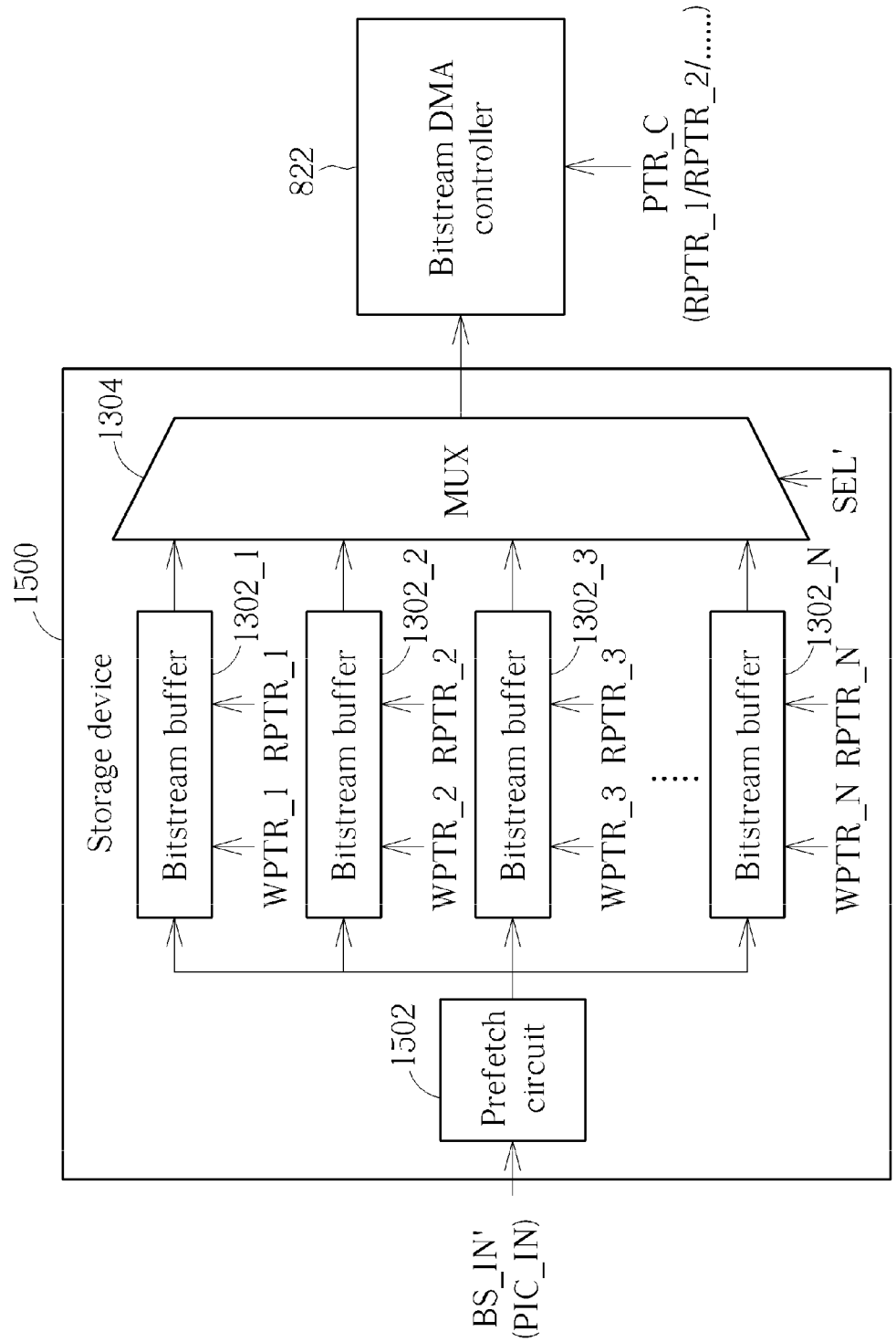
FIG. 17 is a diagram illustrating a storage device according to a third embodiment of the present invention.
Figure 18:
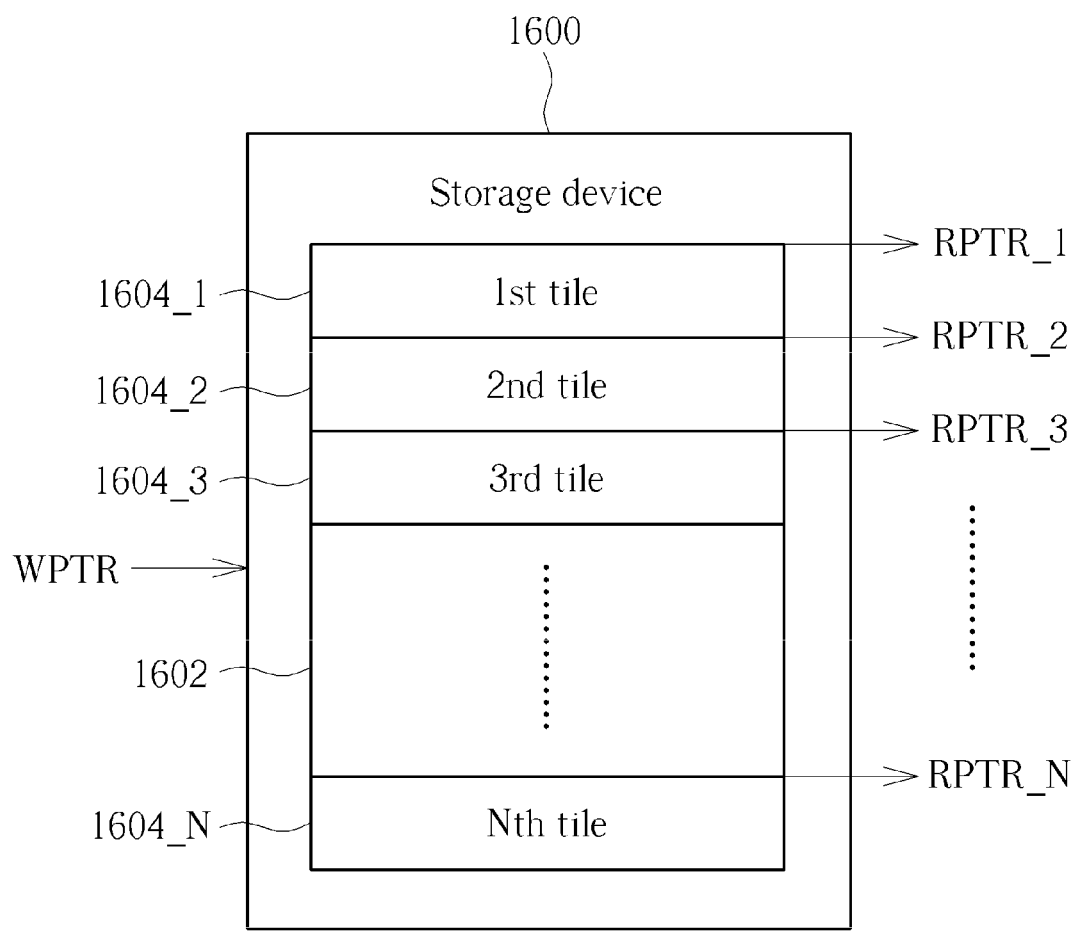
FIG. 18 is a diagram illustrating a storage device according to a fourth embodiment of the present invention.
Figure 19:
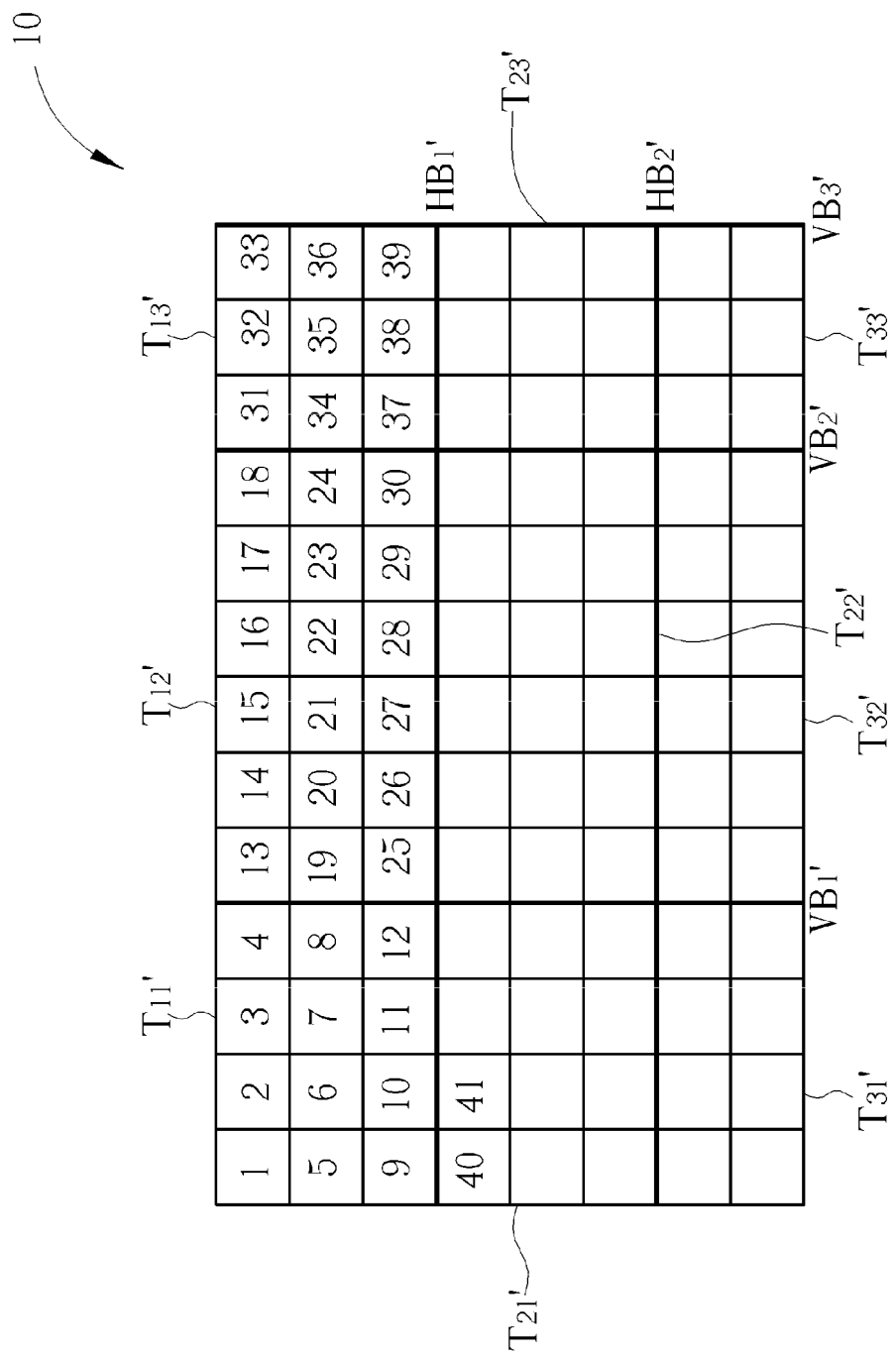
FIG. 19 is a diagram illustrating tiles adopted in the HEVC specification.
Figure 20:
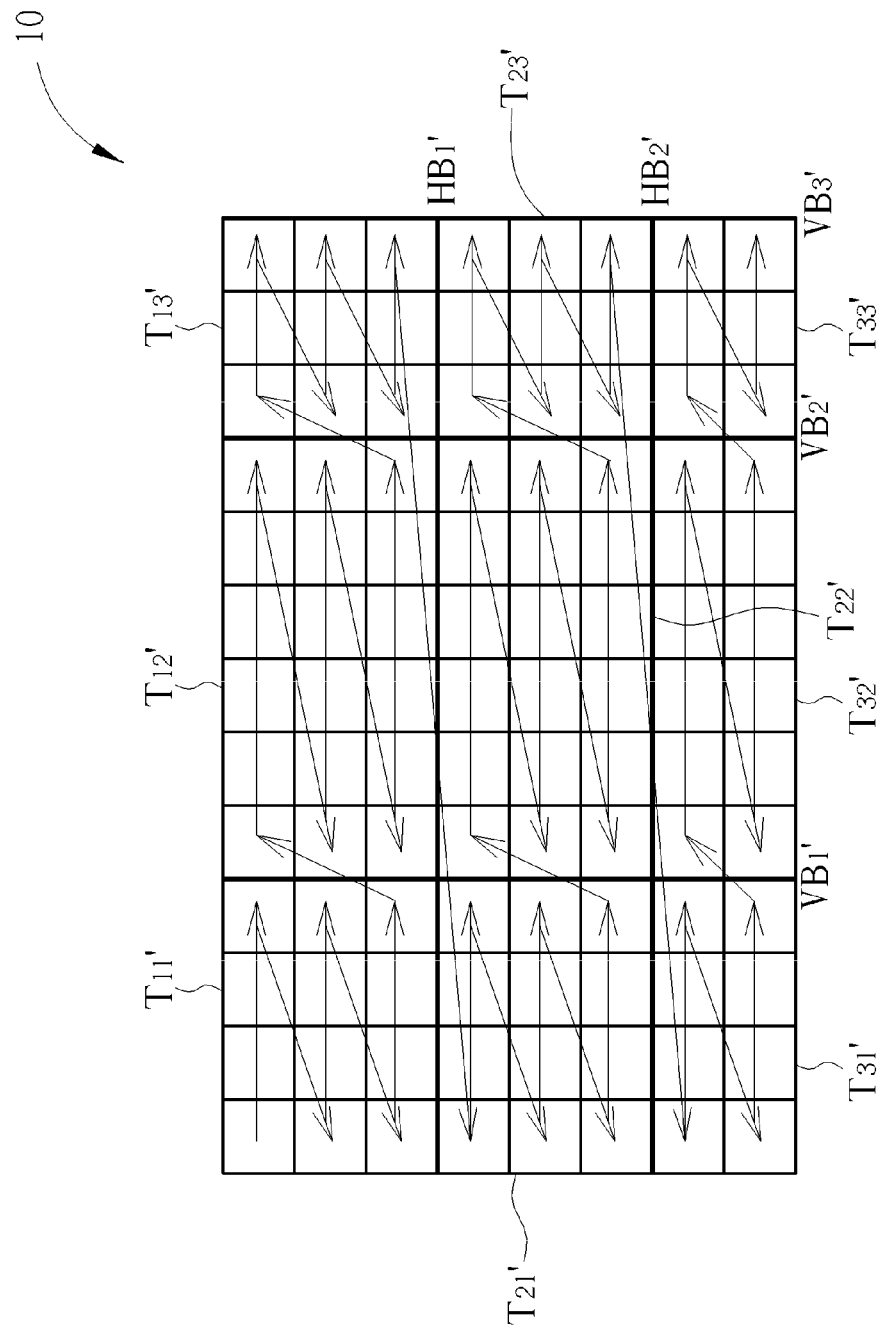
FIG. 20 is a diagram illustrating a conventional decoding order of the tiles shown in FIG. 19.

Regarding above exemplary implementations of the storage device 812 shown in FIG. 8, the storage device 1300/1400/1500 in FIG. 15/FIG. 16/FIG. 17 is implemented using a plurality of bitstream buffers, such as continuous/discontinuous ring buffers, to save the buffer size. However, this is not meant to be a limitation of the present invention. Alternatively, the storage device 812 may be implemented using a single bitstream buffer. Please refer to FIG. 18, which is a diagram illustrating a storage device according to a fourth embodiment of the present invention. The combination of multiple bitstream buffers and one multiplexer shown in FIG. 15/FIG. 16/FIG. 17 may be replaced with the single bitstream buffer 1602 of the storage device 1600. The single bitstream buffer 1602 has a plurality of distinct buffer sections 1604_1, 1604_2, 1603-1604_N each providing a storage space for data buffering. One write pointer WPTR controls the write address at which the LCU/MB data of the $1^{st}$-$N^{th}$ tiles is stored into the single bitstream buffer 1602, and each of the read pointers RPTR_1-RPTR_N controls the read address at which the buffered LCU/MB data of a corresponding tile is read from one buffer section of the bitstream buffer 1602. Initially, each of the read pointers RPTR_1-RPTR_N indicates a start point of a corresponding tile in the bitstream buffer 1602. After decoding of a tile is started, a corresponding read pointer will be properly updated to indicate the read address of the buffered LCU/TB data to be decoded.

By way of example, but not limitation, the number of buffer sections (i.e., storage spaces) allocated in the single bitstream buffer 1602 depends on the partitioning setting of the multi-tile encoded picture PIC_IN. For example, when the multi-tile encoded picture PIC_IN has N horizontally adjacent partitions (i.e., N horizontal partitions/tiles at the same row), the number of buffer sections allocated in the single bitstream buffer 1602 is equal to N. Regarding the example shown in FIG. 9, N is equal to 3. Hence, there are three buffer sections (e.g., 1604_1-1604_3) used for buffering LCU/TB/MB data of three tiles (e.g., $T_{11}$-$T_{13}$, $T_{21}$-$T_{23}$, or $T_{31}$-$T_{33}$), respectively.

Please note that the above-mentioned exemplary embodiments are directed to buffering and decoding a multi-tile HEVC/JPEG-XR bitstream. However, this is not meant to be a limitation of the present invention. The proposed buffering mechanism and/or prefetch mechanism may be employed for processing any multi-tile based bitstream.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for read pointer maintenance of a buffering apparatus which is arranged to buffer data of a multi-tile encoded picture having a plurality of tiles included therein, the method comprising:

judging if decoding of a first tile of the multi-tile encoded picture encounters a tile boundary of the first tile; and when it is judged that the tile boundary of the first tile is encountered, loading a selected read pointer from a pointer buffer to act as a currently used read pointer;

wherein the currently used read pointer is indicative of an access position of a requested data to be decoded; when the selected read pointer is loaded from the pointer buffer, the currently used read pointer is changed from a read pointer of the first tile to the selected read pointer; and the currently used read pointer is not changed from the read pointer of the first tile to the selected read pointer until it is judged that the tile boundary of the first tile is encountered.

2. The method of claim 1, wherein the selected read pointer is a read pointer of a second tile to be decoded immediately after the first tile.

3. The method of claim 1, wherein the tile boundary is a right vertical boundary.

4. The method of claim 1, wherein the whole multi-tile encoded picture is decoded in a raster scan order, and decoding of a portion of a second tile starts after decoding of a portion of the first tile is completed.

5. The method of claim 1, wherein the multi-tile encoded picture complies with a High-Efficiency Video Coding (HEVC) specification or a Joint Photographic Experts Group extended range (JPEG-XR) specification.

6. The method of claim 1, wherein the multi-tile encoded picture has N horizontally adjacent partitions, a number of read pointers maintained in the pointer buffer is equal to N, and N is a positive integer.

7. The method of claim 1, wherein when it is judged that the tile boundary of the first tile is encountered, the read pointer of the first tile acting as a previous currently used read pointer is stored into the pointer buffer.

8. A buffer controller for read pointer maintenance of a buffering apparatus which is arranged to buffer data of at least a multi-tile encoded picture having a plurality of tiles included therein, the buffer controller comprising:

a judging unit, arranged for judging if decoding of a first tile of the multi-tile encoded picture encounters a tile boundary of the first tile; and a control unit, arranged for loading a selected read pointer from a pointer buffer to act as a currently used read pointer when the judging unit judges that the tile boundary is encountered;

wherein the currently used read pointer is indicative of an access position of a requested data to be decoded; when the selected read pointer is loaded from the pointer buffer, the currently used read pointer is changed from a read pointer of the first tile to the selected read pointer; and the currently used read pointer is not changed from the read pointer of the first tile to the selected read pointer until it is judged that the tile boundary of the first tile is encountered.

9. The buffer controller of claim 8, wherein the selected read pointer is a read pointer of a second tile to be decoded immediately after the first tile.

10. The buffer controller of claim 8, wherein the tile boundary is a right vertical boundary.

11. The buffer controller of claim 8, wherein the whole multi-tile encoded picture is decoded in a raster scan order, and decoding of a portion of a next tile starts after decoding of a portion of a current tile is completed.

12. The buffer controller of claim 8, wherein the multi-tile encoded picture complies with a High-Efficiency Video Coding (HEVC) specification or a Joint Photographic Experts Group extended range (JPEG-XR) specification.

13. The buffer controller of claim 8, wherein the multi-tile encoded picture has N horizontally adjacent partitions, a number of read pointers maintained in the pointer buffer is equal to N, and N is a positive integer.

14. The buffer controller of claim 8, wherein when the judging unit judges that the tile boundary of the first tile is encountered, the control unit is further arranged for storing the read pointer of the first tile acting as a previous currently used read pointer into the pointer buffer.

15. A buffering apparatus for buffering data of at least a multi-tile encoded picture having a plurality of tiles included therein, the buffering apparatus comprising:

a first storage space, arranged to buffer a first tile of the multi-tile encoded picture; and a second storage space, arranged to buffer a second tile of the multi-tile encoded picture;

wherein the first tile is currently decoded, the second tile is not currently decoded, and an output of the second storage space is not fed into the first storage space.

16. The buffering apparatus of claim 15, wherein the first storage space and the second storage space are provided by a plurality of ring buffers dedicated to buffering data of the first tile and data of the second tile, respectively.

17. The buffering apparatus of claim 15, wherein the tiles of the multi-tile encoded picture are transmitted sequentially, and the buffering apparatus further comprises:

a prefetch circuit, arranged to prefetch data of the second tile and store prefetched data into the second storage space while the first storage space is receiving and buffering data of the first tile.

18. The buffering apparatus of claim 15, further comprising:

a prefetch circuit, comprising:

a storage unit; and a prefetch unit, arranged to prefetch data of the second tile from the second storage space and store prefetched data into the storage unit while a decoding apparatus is decoding data of the first tile, wherein the prefetched data stored in the prefetch unit is read by the decoding apparatus when the decoding apparatus is operative to start decoding the data of the second tile.

19. The buffering apparatus of claim 15, wherein the multi-tile encoded picture complies with a High-Efficiency Video Coding (HEVC) specification or a Joint Photographic Experts Group extended range (JPEG-XR) specification.

20. The buffering apparatus of claim 15, wherein the data of the multi-tile encoded picture is decoded in a raster scan order, and decoding of a portion of the second tile starts after decoding of a portion of the first tile is completed.

21. The buffering apparatus of claim 15, wherein the multi-tile encoded picture has N horizontally adjacent partitions, a number of storage spaces implemented in the buffering apparatus is equal to N, and N is a positive integer.

* * * * *